US012694451B2

(12) United States Patent
Shah

(10) Patent No.: US 12,694,451 B2
(45) **Date of Patent: *Jul. 28, 2026**

(54) COMPUTER-CONTROLLED MARKETPLACE NETWORK FOR DIGITAL TRANSACTIONS

(71) Applicant: Intellectual Frontiers LLC, Silver Spring, MD (US)

(72) Inventor: Shahid N. Shah, Silver Spring, MD (US)

(73) Assignee: Intellectual Frontiers LLC, Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/303,350

(22) Filed: Aug. 18, 2025

(65) Prior Publication Data

US 2026/0004347 A1 Jan. 1, 2026

Related U.S. Application Data

(60) Continuation of application No. 18/372,652, filed on Sep. 25, 2023, now Pat. No. 12,437,338, which is a (Continued)

(51) Int. Cl.
*G06Q 40/04* (2012.01)
*G06Q 30/0601* (2023.01)

(Continued)

(52) U.S. Cl.
CPC ......... *G06Q 40/04* (2013.01); *G06Q 30/0605* (2013.01); *H04L 9/0643* (2013.01);

(Continued)

(58) Field of Classification Search
None
See application file for complete search history.

(56) References Cited

U.S. PATENT DOCUMENTS 5,892,900 A * 4/1999 Ginter ................... G06Q 20/12
726/26
7,260,224 B1 * 8/2007 Ingle ..................... H04L 9/0838
380/279

(Continued)

FOREIGN PATENT DOCUMENTS

AU 2018100150 A4 3/2018
CN 101639828 2/2010

(Continued)

*Primary Examiner* — Jahed Ali
(74) *Attorney, Agent, or Firm* — Rahman LLC

(57) ABSTRACT

A marketplace network for facilitating transactions among a plurality of marketplace participants. The marketplace network includes a plurality of service provider systems associated with respective service provider participants. Each of the plurality of service provider systems are communicatively coupled to a respective merchant server. The marketplace network includes a plurality of user systems associated with respective user participants configured to generate a service request to one of the plurality of service provider systems. The marketplace server facilitates transactions digitally by executing a set of computer-executable tasks for securely processing transactional exchanges among the marketplace participants. The transactional exchanges include at least exchanges of ownership rights for digitally stored data at least in part owned originally by the user participants.

19 Claims, 9 Drawing Sheets

Related U.S. Application Data division of application No. 16/854,872, filed on Apr. 21, 2020, now Pat. No. 11,880,882.

(60) Provisional application No. 62/838,473, filed on Apr. 25, 2019.

(51) Int. Cl.

| | |
|---|---|
| *H04L 9/06* | (2006.01) |
| *H04L 9/32* | (2006.01) |
| *H04W 4/14* | (2009.01) |
| *H04L 9/00* | (2022.01) |

(52) U.S. Cl.

CPC ............. *H04L 9/3213* (2013.01); *H04W 4/14* (2013.01); *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 7,263,561 | B1 * | 8/2007 | Green | G06F 21/56 |
| | | | | 709/206 |
| 7,552,862 | B2 * | 6/2009 | Flake | G06Q 30/00 |
| | | | | 235/375 |
| 8,065,424 | B2 * | 11/2011 | Foresti | H04L 51/08 |
| | | | | 340/7.22 |
| 9,699,606 | B1 * | 7/2017 | Bhatia | G06Q 10/0833 |
| 10,742,420 | B1 * | 8/2020 | Griffin | H04L 9/3093 |
| 11,632,531 | B1 | 4/2023 | Bryan et al. | |
| 2004/0054632 | A1 * | 3/2004 | Remy | G06Q 20/04 |
| | | | | 705/64 |
| 2007/0016613 | A1 * | 1/2007 | Foresti | G06Q 10/107 |
| 2008/0000964 | A1 | 1/2008 | Flake et al. | |
| 2008/0028446 | A1 * | 1/2008 | Burgoyne | H04L 51/216 |
| | | | | 726/6 |
| 2008/0103829 | A1 * | 5/2008 | Mankopf | G06Q 30/02 |
| | | | | 726/1 |
| 2009/0132965 | A1 * | 5/2009 | Shimizu | G06F 3/0482 |
| | | | | 715/853 |
| 2011/0047450 | A1 * | 2/2011 | Park | H04N 1/32363 |
| | | | | 715/234 |
| 2011/0138296 | A1 * | 6/2011 | Cha | G06F 21/64 |
| | | | | 715/741 |
| 2011/0295694 | A1 * | 12/2011 | Coggeshall | G06Q 30/02 |
| | | | | 705/14.69 |
| 2012/0323794 | A1 * | 12/2012 | Livshits | G06Q 30/02 |
| | | | | 705/7.32 |
| 2013/0211876 | A1 * | 8/2013 | Perler | G06F 21/31 |
| | | | | 726/28 |
| 2013/0226607 | A1 * | 8/2013 | Woody | G16H 40/60 |
| | | | | 705/2 |
| 2013/0238979 | A1 * | 9/2013 | Sayers, III | G06F 40/166 |
| | | | | 715/234 |
| 2014/0344015 | A1 * | 11/2014 | Puertolas-Montanes | |
| | | | | G06Q 30/0201 |
| | | | | 705/7.29 |
| 2015/0082050 | A1 * | 3/2015 | Roullier | G06F 21/6254 |
| | | | | 713/189 |
| 2015/0379510 | A1 * | 12/2015 | Smith | G06F 21/64 |
| | | | | 705/71 |
| 2016/0005043 | A1 * | 1/2016 | Goldstone | G06Q 20/108 |
| | | | | 705/44 |
| 2016/0012465 | A1 * | 1/2016 | Sharp | G06Q 20/321 |
| | | | | 705/14.17 |
| 2016/0098779 | A1 * | 4/2016 | Wilczek | G06Q 30/0633 |
| | | | | 705/26.8 |
| 2017/0034245 | A1 * | 2/2017 | Asano | G06Q 30/0277 |
| 2017/0039623 | A1 * | 2/2017 | Boraski | G06Q 30/0633 |
| 2017/0091699 | A1 * | 3/2017 | Mueller | G06Q 10/083 |
| 2017/0103472 | A1 * | 4/2017 | Shah | G06Q 10/40 |
| 2018/0189732 | A1 * | 7/2018 | Kozloski | G06F 8/71 |
| 2018/0253702 | A1 * | 9/2018 | Dowding | H04L 63/123 |
| 2019/0075102 | A1 * | 3/2019 | Kim | H04L 9/3247 |
| 2019/0215564 | A1 * | 7/2019 | Webb | H04N 21/4622 |
| 2019/0312831 | A1 * | 10/2019 | Gupta | H04L 51/216 |
| 2020/0034836 | A1 * | 1/2020 | Shah | G06Q 20/02 |
| 2020/0119905 | A1 | 4/2020 | Revankar et al. | |
| 2020/0202038 | A1 | 6/2020 | Zhang et al. | |
| 2020/0250665 | A1 * | 8/2020 | Wu | G06Q 20/12 |
| 2021/0082033 | A1 | 3/2021 | Yao | |
| 2025/0111908 | A1 * | 4/2025 | Shah | G06Q 10/06315 |

FOREIGN PATENT DOCUMENTS

| | | | | |
|---|---|---|---|---|
| GB | 2548851 A | 10/2017 | | |
| KR | 20090017051 | 2/2009 | | |
| WO | WO-2004061650 A2 * | 7/2004 | | G06F 8/427 |
| WO | 2014072739 A1 | 5/2014 | | |
| WO | WO-2017091530 A1 * | 6/2017 | | H04L 9/50 |
| WO | 2020024627 A1 | 2/2020 | | |

* cited by examiner

Figure 7:
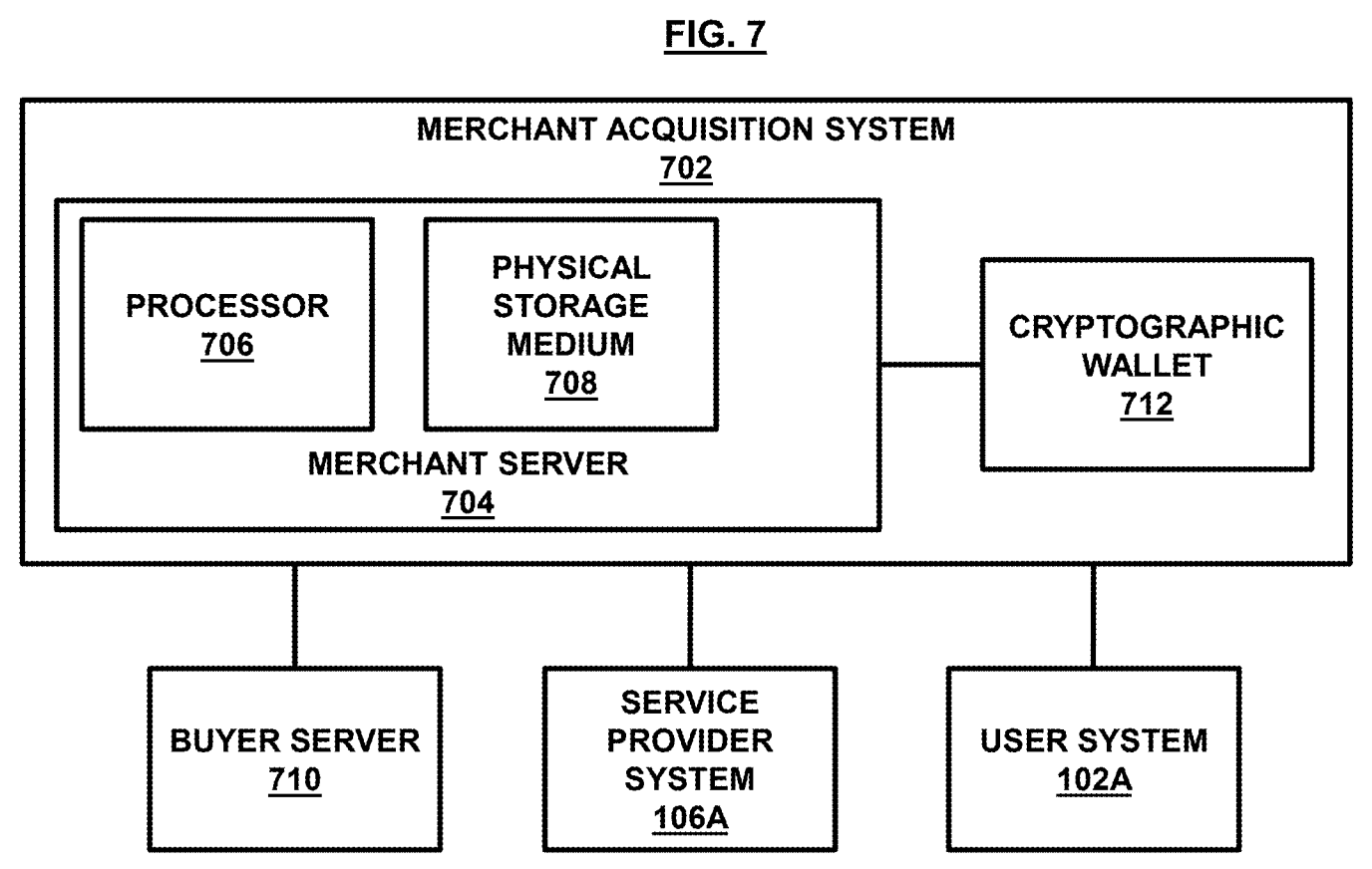

MERCHANT ACQUISITION SYSTEM
702

CRYPTOGRAPHIC WALLET
712

MERCHANT SERVER
704

PROCESSOR
706

PHYSICAL STORAGE MEDIUM
708

USER SYSTEM
102A

SERVICE PROVIDER SYSTEM
106A

BUYER SERVER
710

1

COMPUTER-CONTROLLED MARKETPLACE NETWORK FOR DIGITAL TRANSACTIONS

CROSS-REFERENCE TO RELATED APPLICATIONS

This is a continuation application of U.S. patent application Ser. No. 18/372,652 filed on Sep. 25, 2023, which is a divisional application of U.S. patent application Ser. No. 16/854,872 filed on Apr. 21, 2020 (now U.S. Pat. No. 11,880,882 issued on Jan. 23, 2024), which claims priority to U.S. Patent Provisional Application No. 62/838,473 filed on Apr. 25, 2019, the complete disclosures of which, in their entireties, are hereby incorporated by reference.

BACKGROUND

Technical Field

The embodiments herein generally relate to computer-controlled systems, and more particularly to, a computer-controlled marketplace network for enabling transactional exchanges digitally among various participants of the marketplace network.

DESCRIPTION OF THE RELATED ART

In a marketplace ecosystem, a large number of parties are involved for transactional exchanges and a lot of transactions happen among buyers and service providers for the purchase and delivery of various products and services. Among these ecosystems, payment transactions have received a lot of attention from the service providers and the buyers since payment is central to building a marketplace. Most of the payment modes are still dependent on traditional financial instruments such as cash and credit transactions. These marketplaces are attempting to develop more ways of facilitating payments in order to become the most widely accepted payment service at the same time ensuring reliable processing of the marketplace transactions among thousands and millions of participants. However, in view of the various attempts to develop such a payment service system, there is still a need of a new and a more secured and enhanced dynamic way of processing marketplace transactions involving millions of participants.

SUMMARY

In view of the foregoing, an embodiment herein provides a networked system containing a computer-controlled marketplace network for facilitating seamless transactions among a plurality of marketplace network participant systems. The networked system includes a plurality of service provider systems associated with respective service provider participants and located remotely from one another physically in respective service settings that each includes one or more central servers, data stores, and cloud-based computing components for managing and processing delivery of one or more services in the service settings by the plurality of service provider systems. Each of the plurality of service provider systems are communicatively coupled to a respective merchant server. The marketplace network further includes a plurality of user systems associated with respective user participants located remotely from one another and remotely from the plurality of service provider systems and configured to generate a service request to one of the plurality of service provider systems in the marketplace network.

The marketplace server facilitates marketplace transactions digitally by executing a set of computer-executable tasks for securely processing transactional exchanges among the marketplace network participant systems, wherein the transactional exchanges include at least exchanges of ownership rights for digitally stored data at least in part owned originally by the user participants. The marketplace server includes a marketplace interaction component where the service provider participants can establish their one or more offerings digitally for the transactional exchanges. The one or more offerings are associated with respective transactional values that are predefined across the marketplace network by the respective service provider participants. The marketplace server includes a memory circuit configured to store transactional information associated with each transactional exchange of the transactional exchanges among the participants in the marketplace network. The marketplace server includes a processing circuit in communication with the memory circuit and configured to process a transactional exchange digitally and generate an ownership trail of a transacted offering when a user participant consents for data ownership transfer, exclusively or inclusively for the data at least in part, from the user participant, toward a digital purchase and delivery of the offering, wherein the data at least in part has a value of at least equal to a transactional value of the offering exchanged between the service provider participant and the user participant over the marketplace network.

The marketplace interaction component may allow the service provider systems to define a set of digitally recognizable data valuation parameters for one or more entities and attributes associated with the one or more entities, publish the set of digitally recognizable data valuation parameters defined by the service provider systems, transact for the offerings digitally published in the marketplace network with the data ownership transfer for the data at least in part valued at the transactional value, associated with the offering, calculated in accordance with the set of digitally recognizable data valuation parameters identified by the service provider systems.

The set digitally recognizable data valuation parameters include one or more of type of the data, length of the data, source of the data, number of entities contained in the data, and number of attributes associated with each of the entities. The transaction exchange may include delivery of the offering to the user participant by the service provider system and transferring of the data to the service provider system by the user participant system at the time of the transaction exchange, wherein the transferring of the data to the service provider system includes one or more of changing access privileges for the service provider system for the data and sharing access credentials of a secured repository containing the data to the service provider system for allowing access. The transaction exchange may include delivery of the offering to the user participant by the service provider system at the time of transaction exchange and delaying the transferring of the data to the service provider system by the user participant system for a later specified time depending on availability of the data with the user participant system.

The system may include a plurality of buyer systems associated with respective buyer participants located remotely from one another and remotely from the service provider systems and the user systems, wherein each of the plurality of buyer systems comprises a respective buyer server. The service provider system may be communicatively coupled to the buyer system such that the transactional value for the offering is defined based on an input received from the buyer system by the service provider system, further wherein the trail of ownership transfer comprises at least a transfer of ownership from the user participant to the service provider participant, and from the service provider participant to the buyer participant either in real-time or deferred for a later time than when the transactional exchange is performed.

The plurality of participant systems may be in communication with one another over a peer-to-peer communication network that maintains a decentralized blockchain ledger for tracking and recording the transactional exchanges and ownership trails, wherein each of the participant systems includes at least one processing circuit and at least one physical storage medium that stores at least a portion of the decentralized blockchain ledger comprising a distributed database to record transactional information associated with a transactional exchange that occur on the peer-to-peer communication network between at least two participants systems.

An embodiment herein provides a merchant acquisition system for facilitating acquisition of an item in a digital marketplace network. The merchant acquisition system includes a merchant server communicatively coupled and associated with a service provider system. The merchant server includes a processor and a physical storage medium that stores merchandise information and transactional information associated with the service provider system. The processor is configured to define a set of digitally recognizable data valuation parameters for one or more entities and attributes associated with tradable data originally stored at a user system remotely located from the merchant server. The processor is further configured to publish the set of digitally recognizable data valuation parameters defined by the service provider system in the marketplace network along with digitally listed one or more offerings and transact for the item with a user participant associated with the user system with data ownership transfer for the tradable data at least in part owned originally by the user participant and valued at a transactional value no less than value of the item calculated in accordance with the set of digitally recognizable data valuation parameters defined by the service provider system.

The merchant server may be communicatively coupled to a buyer server located remotely from the merchant server, wherein the buyer server is associated with a respective buyer participant, such that the transactional value for the offering may be defined by the merchant server based on an input received from the buyer server. An ownership trail of the data ownership transfer for the data at least in part may include at least a transfer of the ownership from the user participant to the service provider participant, and from the service provider participant to the buyer participant either in real-time or deferred for a later time than when the acquisition of the item is performed.

The merchant server, the buyer server, and the user system are in communication with one another over a peer-to-peer communication network that maintains a decentralized blockchain ledger for tracking and recording the acquisition of the item and the ownership trail. Each of the merchant server, the buyer server, and the user system may include at least one processing circuit and at least one physical storage medium that stores at least a portion of the decentralized blockchain ledger including a distributed database to record acquisition information associated with the acquisition of the item that occur on the peer-to-peer communication network between at least two of the merchant server, the buyer server, and the user system.

The merchant server may be a first merchant server and the service provider system may be a first service provider system, such that the system may further include an arbitrarily large number of merchant servers associated with respective service provider systems, each publishing one or more digital offerings in the marketplace network tradable in return of ownership transfer of one or more data files from an arbitrarily large number of computer-executable data files. Each of the computer-executable data files may be owned originally by a user participant from an arbitrarily large number of user participants associated with respective user systems and communicating with the first merchant server and the arbitrarily large number of merchant servers over the marketplace network.

The merchant server may enable a cryptographic wallet to reflect equivalent transactional value of one or more computer-executable data files owned originally by the user participant and marked by the user participant for trading in the marketplace network, wherein the one or more computer-executable data files includes the tradable data in return of the one or more offerings. The cryptographic wallet may provide one or more acquisition-driven smart contracts that may enable security of transactional information among transacting participants. The cryptographic wallet may be configured to append blocks to the decentralized blockchain ledger with every acquisition which may enable recording of the transactional information across many systems associated with the network participants so that any involved information cannot be altered.

The acquisition of the item may include either of: 1) delivery of the offering to the user participant by the merchant server and transferring of the data to the merchant server by the user participant system at the time of the acquisition. The transferring of the data to the merchant server may include one or more of modifying access privileges for the merchant server so as to allow the data to be accessed by the merchant server, and sharing access credentials of a secured repository containing the data to the merchant server for allowing access. 2) delivery of the offering to the user participant by the merchant server at the time of acquisition of the item and delaying the transferring of the data to the merchant server by the user participant system for a later specified time depending on availability of the data with the user participant system. The set digitally recognizable data valuation parameters may include one or more of type of the data, length of the data, source of the data, number of entities contained in the data, and number of attributes associated with each of the entities.

An embodiment herein provides a computer-controlled system for automated evidence-based transactional exchange between a service provider system associated with a service provider and a mobile communication device associated with a user. The system includes a merchant server configured to collect predefined information about a mobile communication device and an associated user. The predefined information includes at least a first computer-executable input indicative of an identifier of the mobile communication device and the associated user, and a second computer-executable input indicative of a service sought for delivery in the service setting. The merchant server is further configured to generate a first short message service component (SMS) that is sent to the mobile communication device. The merchant server is further configured to generate a second short message service component (SMS) that is sent to a service provider system. The first SMS and the second SMS contain a first secured hashlink and a second secured hashlink respectively that are executable by the user and the service provider respectively, such that the first SMS and the second SMS are indicative of delivery of the service. The merchant server is further configured to allow a transaction involving delivery of the service to the user and transfer of ownership of digitally executable data originally owned by the user to the service provider when the data is available at a later time in return of the service availed by the user.

The data may be valued at no less than a value of the service calculated in accordance with a set of digitally recognizable data valuation parameters defined by the service provider system. The merchant server may generate and send a confirmation electronic message along with a digitally executable unique service proof token (SPT) to the mobile communication device and the service provider system upon completion of the service delivery after execution of the first secured hashlink and the second secured hashlink respectively by the mobile communication device and the service provider system. The unique SPT may be associated with each of the mobile communication device and the service provider system and may be indicative of completion and delivery of the service by the service provider system to the user associated with the mobile communication device.

The service provider system may be able to access the data automatically from a database when the data is available upon submitting the service proof token (SPT). The SPT may serve as an evidence of the delivery of the service by the service provider to the user at a different prior time when the data was not yet available.

The system may further include a blockchain device configured to automatically store computer-executable instructions including the SPT associated with the mobile communication device and the service provider system for delivery of the service. The system may further include a central verification device to verify the evidence of the service delivery. The central verification device may be configured to compare the SPT submitted by the service system with the SPT stored in the blockchain device to allow the service provider system access to the database storing the data.

An embodiment herein provides a computer-controlled system for automated evidence-based transactional exchange between a service provider system associated with a service provider and a mobile communication device associated with a user. The system includes a server configured to collect predefined information about a mobile communication device and an associated user. The predefined information includes at least a first computer-executable input indicative of an identifier of the mobile communication device and the associated user, and a second computer-executable input indicative of a service sought for delivery in the service setting. The server is further configured to generate and send a confirmation electronic message along with a digitally executable unique service proof token (SPT) to the mobile communication device and the service provider system upon completion of the service delivery. The unique SPT is associated with each of the mobile communication device and the service provider system and records an evidence of the completion and delivery of the service by the service provider system to the user associated with the mobile communication device. The server is further configured to allow a transaction involving transfer of ownership of digitally executable data, originally owned by the user, to the service provider system when the data is available at a later time in return of the service availed by the user.

The server may be further configured to generate a first short message service component (SMS) that may be sent to the mobile communication device. The server may be further configured to generate a second short message service component (SMS) that may be sent to the service provider system. The first SMS and the second SMS contain a first secured hashlink and a second secured hashlink respectively that are executable by the user and the service provider respectively, such that the first SMS and the second SMS are indicative of delivery of the service. The SPT may be generated after execution of the first secured hashlink and the second secured hashlink respectively by the mobile communication device and the service provider system. The first secured hashlink and the second secured hashlink may each be executable with clicks such that the execution of the first secured hashlink and the second secured hashlink may record a proof of respective locations of the mobile communication device and the service provider system.

The respective clicks may record GPS locations of the mobile communication device and the service provider system. The system may include a blockchain device such that the GPS locations of the mobile communication device and the service provider system along with service details may be stored in the blockchain device within the STP. The service provider system may be configured to automatically secure the ownership of the digitally executable data at a later time using the STP from the blockchain device.

BRIEF DESCRIPTION OF THE DRAWINGS

The embodiments herein will be better understood from the following detailed description with reference to the drawings, in which:

FIG. 7 illustrates an exemplary merchant acquisition system connected with other devices and servers in accordance with an embodiment herein;

DETAILED DESCRIPTION

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
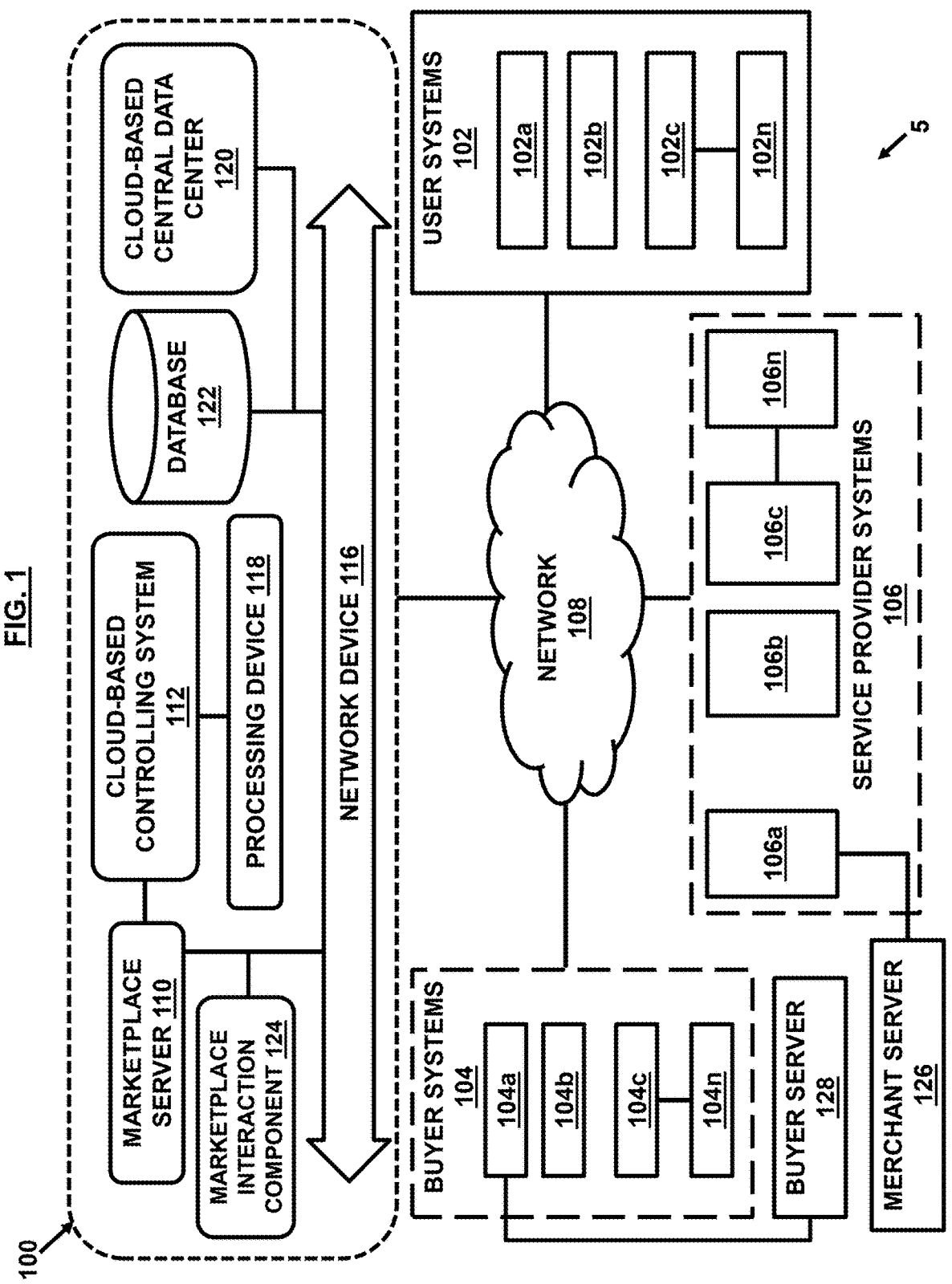
FIG. 1 illustrates, among other things, an example of a computerized architecture for a marketplace in which various embodiments herein may operate.

FIG. 1 illustrates a block diagram of a system 5 containing an online marketplace network 100 connecting a plurality of user systems 102 (102a, 102b, 102c, . . . , 102n), which may be mobile communication devices or computers associated with a plurality of users (or user participants), a plurality of buyer systems 104 (104a, 104b, 104c, . . . , 104n), which may be mobile communication devices or computers associated with a plurality of buyers (or buyer participants), and a plurality of service provider systems 106 (106a, 106b, 106c, . . . , 106n), which may be mobile communication devices or computers associated with a plurality of service providers (service provider participants). A service provider may provide different types of services and products (items) for the users digitally through the online marketplace network 100. The marketplace network 100 may be enabled through a network 108 which may run, govern and facilitate fulfillment of a service request made by the users, service providers and the buyers within the network 108. All the different types of systems and associated entities such as the users, buyers, and the service providers may be referred to as marketplace participants or participants.

The online marketplace network 100 may further include a marketplace server 110, a cloud-based central controlling system 112 (also referred to as a controlling system or a control system), a cloud-based central data center 114 (or data center), and a network device 116 providing networked facilities for the participants within the network 108 enabling the online marketplace network 100 also referred to as digital marketplace network 100 without limitations.

The marketplace network 100 may provide an online platform accessible through a mobile device app or a website which may provide users a graphical user interface through which a user can register or book a service (a tangible product included within the interpretation of a service or services without limitations), browse through a list of services listed in the marketplace network 100, select a service of interest (referred to as a selected item or selected service) from a plurality of services listed in the marketplace network 100 by the service providers. The marketplace network 100 may allow a user to either buy the selected item or add it to a user cart provided by the marketplace network 100 for buying in the future. The online platform or marketplace network 100 provides an effective and efficient method for the user to search among a large number of services provided by any of the plurality of service providers and listed in the marketplace network 100 digitally.

The marketplace network 100 may include an arbitrarily large number of service providers and may facilitate and enable the customers (users) to place orders from a large variety of services and products. The buyer systems 104 (also referred to as service provider or vendor systems) may have to first register with the online marketplace network 100 and verify their identity to access functionalities provided by the online marketplace network 100. The registration and verification of the service providers help prevent the users from fraud, provide security and maintains a quality check. The marketplace network 100 may also provide a service provider rating facility which may be aimed to help the service providers and customers to understand market dynamics better and help build trust between the participants based on reputation of the participants.

The online marketplace network 100 may include a notification facility (not shown) which may facilitate notifying the users about arrival of their orders, addition of new products or services or service providers in the marketplace network 100 and so on. The notification facility may be enabled in the form of a short messaging service (SMS) component, email, etc. The marketplace network 100 may also provide an option to change notification settings according to a user's needs.

The online marketplace network 100 may provide a booking/order processing functionality to ensure reserving goods and services by the users and collecting delivery information by the service providers for delivery of the services and goods at a destination selected by the users. The online marketplace network 100 may provide a communication interface between the users and the service providers.

The marketplace network 100 may provide a customer service facility (not shown) executed by the marketplace server 110, which may facilitate keeping in touch with respective customers (or users) of the service providers and grow loyalty. The marketplace network 100 may use the customer service facility for promotions, partner recruitment, collecting and visualizing data to understand tendencies in the marketplace network 100.

In an embodiment, the marketplace network 100 may provide a facility for the service providers or the users to remain anonymous in that their identity is not disclosed publicly in the marketplace network 100. In such cases, only parties that are involved in performing certain transactions such as sale or purchase of a service or product may know the identity of one another through private conversations and a secured one-to-one messaging service. The messaging service may initiate discussions between the parties after both parties agree for the private conversation. This may allow the entities or participants involved in transacting those services that may require a certain level of privacy to perform transactions through the marketplace network 100. Such services may include healthcare services, fintech (financial instruments), and the like without limitations. For example, a patient and a clinician may connect over the marketplace network 100 privately without disclosing their identities publicly in the marketplace network 100.

Security components may be provided to implement any desired level of security, or predefined security measures, or privacy measures, etc. Privacy considerations can be taken into account by the security components. For instance, it may be considered that the various service providers may wish to remain anonymous except to those who avail the services. Similarly, one or more of the users may wish to remain anonymous in that they do not wish to have any selected providers or other users know their identity except the ones whom they finally shortlist for delivering the services. Similarly, information discussed within various communication sessions (or meetings) may be sensitive or confidential which has to be kept private. In such cases, selected providers or users may auto-execute a non-disclosure agreement or other type of confidentiality agreement. The security components may tender the agreement for signature by the service providers and the users concerned during a transaction.

In an embodiment, the marketplace network 100 may provide a seller-financing facility executed through the marketplace server 110 for the users such that they may buy the goods and the services by making some sort of a down payment to the service providers and then make installments (usually a monthly basis) over a specified time and an agreed-upon policy until the loan is fully repaid. The online marketplace network 100 may include listings for transaction offerings that may include transaction terms and seller-financing terms. The transaction terms may include trustworthiness, prior finance records, verification of a service provider. The marketplace network 100 may include the central controlling system 112 that may be configured to interact with the buyers, the users, and the service providers and the associated systems to define terms of the seller-financed transactions. The transaction terms may be evaluated by the central controlling system 112 which may evaluate such as trustworthiness of the service providers, buyers, and the users depending on their prior transactions and monitor compliance of the transaction terms.

In an embodiment, the service provider systems 106 associated with the respective service provider participants are located remotely from one another physically in respective service settings that each includes one or more central servers, data stores, and cloud-based computing components for managing and processing delivery of the services in the service settings by the plurality of service provider systems 106. Each of the service provider systems 106 are communicatively coupled to a respective merchant server such as the merchant server 126 shown in FIG. 1 associated with the service provider system 106a.

In an embodiment, the user systems 102 are associated with the respective user participants and are located remotely from one another and remotely from the service provider systems 106 and are configured to generate the service request to one of the service provider systems 106 in the marketplace network 100.

The marketplace server 110 may facilitate the marketplace transactions or simply the transactions digitally by executing a set of computer-executable tasks for securely processing the transactional exchanges or the transactions among the marketplace network participant systems. The transactional exchanges include at least a transfer of ownership rights for digitally stored data at least in part which is owned originally by the user participants. In an example, the transfer of the ownership rights may include a promise to transfer the data to the buyer systems 104 or the service provider systems 106 by the user systems 102.

The marketplace server 110 may include a marketplace interaction component 124 where the service provider participants can establish their offerings digitally for various transactional exchanges. Each of the offerings is associated with respective transactional values predefined across the marketplace network 100 by the respective service provider participants who enlist them with the marketplace network 100 for the transactional exchanges.

The marketplace interaction component 124 further allows the service provider systems 106 to perform a set of functions such as to define a set of digitally recognizable data valuation parameters for entities and associated attributes, publish the set of digitally recognizable data valuation parameters defined by the service provider systems 106, and to transact for the offerings digitally published in the marketplace network 100 with the data ownership transfer for the data at least in part which is valued at the transactional value set by the service provider systems 106 for the offering. The transactional value associated with the offering may be calculated in accordance with the set of digitally recognizable data valuation parameters identified by the service provider systems 106. The set digitally recognizable data valuation parameters comprise one or more of type of the data, length of the data, source of the data, number of entities contained in the data, and number of attributes associated with each of the entities. For example, of the length of the data is more, then the transactional value of the data may be higher.

The marketplace network 100 may include at least one processing device 118 connected with the central controlling system 112 and at least one computer readable storage device (also referred to as cloud-based central data center) 120 including a database 122 or a memory circuit storing instructions that, when executed by the at least one processing device 118 of the central controlling system 112 may cause to receive descriptions of a plurality of transaction offerings from the service providers for the users of the online marketplace network 100. The transaction offerings are available from the service providers over time against payments for a plurality of listings paid through a method referred to herein as 'data as currency' or "pay per data" method as will be discussed later.

The storage device or the memory circuit also referred to as cloud-based central data center 120 may be configured to store transactional information associated with each transactional exchange of the transactional exchanges among the participants in the marketplace network 100.

The processing circuit or the processing device 118 is in communication with the cloud-based central data center 120 and configured to process a transactional exchange digitally and generate an ownership trail of a transacted offering when a user participant consents for data ownership transfer. The transfer of the ownership of the data may be done exclusively or inclusively such that the rights of the data may still be owned by the original owner along with the participant who newly gets the ownership rights if the transfer is inclusive or may be exclusive is the data is transferred to the new participant with exclusive rights. The transfer of the ownership rights occurs from a user participant, toward a digital purchase and delivery of an offering such that the data at least in part has a value of at least equal to a transactional value of the offering exchanged between the service provider participant and the user participant over the marketplace network 100.

The service provider systems 106 may be communicatively coupled to one or more buyer systems 104 such that the transactional values for the offerings are defined based on an input received from the one or more buyer systems 104 by the service provider systems 106. The trail of ownership transfer may include at least a transfer of the ownership from the user participant to the service provider participant, and from the service provider participant to the buyer participant either in real-time or deferred for a later time than when the transactional exchange is performed. This is because the service provider systems 106 may eventually transact the data with a third party such as the buyer of the data. In some embodiments, however, the buyer may be the service provider only and there may not be a third party involved to govern the transactional value etc.

The ownership trail is a chain or sequence of ownership changes along with details of owners at each stage of ownership change that is digitally recorded in the form of computer-executable files by the marketplace server 110. In an embodiment, the ownership trail is recorded in blockchain ledgers as discussed later.

In an example, the transactional exchange may include delivery of an offering to a user participant or a user system such as user system 102a by a service provider systems 106 such as the service provider system 106a and transferring of the data to the service provider system 106a by the user system 102a at the time of the transaction exchange. The transferring of the data to the service provider system 106a may include one or more of changing access privileges for the service provider system 106a for the data and sharing access credentials of a secured repository containing the data to the service provider system 106a for allowing access to the data. In some cases, the transactional exchange may include delivery of the offering to the user participant by the service provider system 106a at the time of the transactional exchange but delaying the transferring of the data to the service provider system 106a by the buyer system 104a for a later specified time depending on availability of the data with the buyer system 104a.

In an example, each of the buyer systems 104 and the service provider systems 106 may be communicatively coupled to respective buyer servers such as a buyer server 128 associated with the buyer system 104a and respective service provider servers such as a service provider server or merchant server 126 which hosts various processing and data capabilities of the respective systems.

The offerings provided or listed by the service providers may facilitate negotiation of a binding contract between the service providers, the users, and the buyers for transfer of the offerings from the service providers to the users, wherein the binding contracts define a payment term, and wherein the payment term may include prices and seller-financing terms including payments to be made by the service provider or the seller to the buyer over a period of time etc.

In an embodiment, the marketplace network 100 may facilitate an automated on-line selling service mechanism by placing product promotional materials in on-line locations where targeted users are likely to encounter them so that a service provider system 106a may track records of previous purchases made by the users and the online platforms 100 (also referred to as the marketplace) frequently visited by the user systems 102. Based on user search information and track records, the service provider system 106a may target online platforms visited frequently by a user system or user and post the targeted product or service dynamically on the platform for promotional purposes. The automated and dynamic promotion of the targeted products/services for the targeted user system 102a may help in the overall development of the marketplace network 100 by reducing customer acquisition cost and an increase in sale. Customer acquisition cost reduction may be achieved by broadcasting products at targeted places, which deliver high volume and targeted traffic and thereby continually improve selling effectiveness.

The online marketplace network 100 may include a two-way payment system (shown in FIG. 3) enabled through a payment gateway, which will be discussed later. A buyer system 104a herein may want to buy user data associated with a pre-consented user and pay the service provider who transact with the user system 102a on behalf of the user for the services and products bought by the consented user in return of the data of the user (user data). A buyer associated with the buyer system 104a may pay full-service charges or a portion of the service charges depending upon the worth of the user data.

The marketplace network 100 may provide a comprehensive, graphical means by which the users can evaluate services for sale by the service providers including such as healthcare services etc without limitations, view historical transactions, and evaluate a broad level of data related to service transactions. Further, analytical tools may be provided to allow the users to query various data sources to find services as needed by the users in the marketplace network

100 by such service providers who allow transactions through a particular payment process involving transactions of the user data as will be discussed later in conjunction with various figures. For example, not all the service providers may accept the user data in return of the services as an equivalent to currency. But there will be some service providers who will be ready to do transactions through the user data for selling their service. The marketplace network 100 may allow finding such service providers and their services through a search engine enabled through the marketplace server 110.

In some embodiments, the marketplace network 100 may provide the users with valuable data that may be aggregated based on user trends and past transactions for the users. The service providers may also, for example, see how many users have viewed their service details, how many have indicated an interest in their services, and so on, in order to drive marketplace recommendations and growth that is enabled with the user data as a worth for transacting for delivery and receipt of the services.

In embodiments, the valuable data generated in the marketplace network 100 can also be used for targeted advertising. For example, if a user in the marketplace network 100 is viewing a service, the marketplace network 100 might show an advertisement for related service or suitable service providers to the user.

Some embodiments of the marketplace network 100 may provide a mechanism whereby the service providers may pay through the user data (of the consented users) to various entities such as the buyers of the data to promote services or products within the marketplace network 100. For example, an agent may pay an advertising fee to elevate the visibility of that agent within the result set of a given agent search. A service provider may pay a fee to a buyer (who accept data instead of conventional currency) in the form of certain computer-executable files that store the consented users data to elevate the visibility of a given service within the result set of a given service search. In such a scenario each such file containing the user data may be defined for its equivalent worth in terms of certain transactional value so that the user data that has been approved for sharing with others by the owners (herein the users) of the data may drive marketplace transactions as an alternative currency for the marketplace network 100.

In an example, a person may avail healthcare or financial or other services from a service provider in return of his/her diagnostic reports to be shared to the service provider for its right to sell them to a buyer whenever the diagnostic reports are available after a few days.

Figure 2:
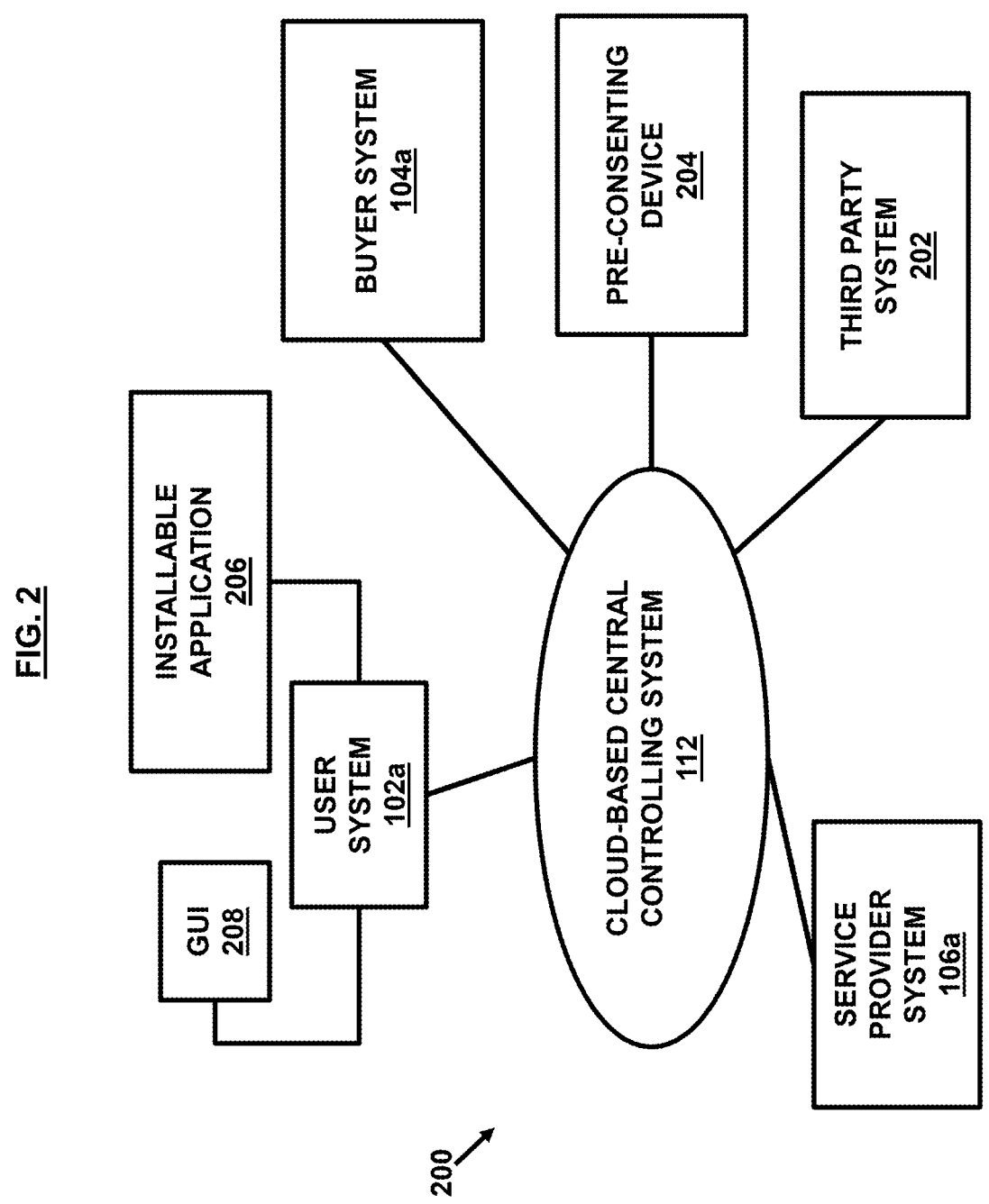
FIG. 2 illustrates a block diagram of a cloud-based central controlling system interacting with various network participants in accordance with an embodiment herein.

FIG. 2, with reference to FIG. 1, illustrates a block diagram of a system 200 for authorization of data usage and/or sharing of data corresponding to a user associated with such as the user system 102a by a service provider or a service provider system 106a, who are connected over the marketplace network 100 as marketplace participants through the network 108, in exchange of one or more services purchased and/or delivered to the user by the service provider. In an embodiment, while the service may be delivered online or offline, but at least one step of the transaction may happen online through the marketplace network 100. As shown in FIG. 2, in an example, the system 200 may include the user system 102a associated with the user, the service provider system 106a associated with the service provider, a third party system 202 associated with a third party such as an insurance agency (and the like without limitations), and a buyer system 106a associated with a buyer. However, the marketplace network 100 may include a plurality of such participants connected through the network 108. The system 200 may further include the cloud-based central controlling system 112 and a pre-consenting device 204.

In an exemplary scenario, when the user system 102a shortlists a service provider from among the service providers listed in the marketplace network 100 who accept certain types of authorized data in return of a service delivery and submits a request for a service delivery to the service provider system 106a through the marketplace network 100, the service provider system 106a associated with the service provider may in turn generate a request for the user system 102a to provide a user consent for usage of the user data (referred to as data simply interchangeably without limitations) through the pre-consenting device 204 which records the response of the user system 102a and acts accordingly. The pre-consenting device 204 is discussed later.

If the user system 102a provides the user consent (also referred to as consent without limitations) to the service provider system 106a, the service provider system 106a may process user details along with authorization details and submit them to the cloud-based central controlling system 112.

In an example, the service provider system 106a may interact with the buyer system 104a via the central controlling system 112 to evaluate user data worth (also referred to as value of the user data or transactional value of the user data) and inform the user system 102a accordingly. In an example, the service provider system 106a may interact only with the cloud-based central controlling system 112 to evaluate the user data worth and inform the user system 102a accordingly without any direct data exchange or communication with the buyer system 104a. The user data worth may be calculated based on a predefined set of criteria (also referred to as digitally recognizable data valuation parameters) specified by the buyer system 104a or the service provider system 106a for a set of entities and attributes so that delivery of the services can be defined in terms of transactional values payable through the user data by the user upon authorization via the pre-consenting system 204 and executable through an executable input interface provided by the marketplace network 100.

The entities and attributes are terms defined with respect to data models herein. For example, a person, organization, event, etc. may be considered as an entity and corresponding information fields for an entity such as a state, person's behavior and methods (if any) related to the entity are considered as its attributes. For example, if a person is an entity in a particular scenario, the data fields related to the person such as address, company the person works in, education of the person, etc. are respective attributes of the entity (person).

The buyer system 104a may be configured to communicate with the cloud-based central controlling system 112 (also referred to as controlling system 112 for the purpose of simplicity without limitations) to submit information stored as computer-executable files in the controlling system 112 such that the information may be indicative of buyer interests for a plurality of data types and respective worth in terms of transactional values for purchase over the digital network 108 enabling the marketplace network 100 through appropriate digital authorization by data owners, herein the user system 102a or the user. In an example, the computer-executable files may store information pertinent to certain data types the buyer system 104a may want to approve digitally or may be interested in for purchase (called approved data types), data worth for each of the approved data types, authorization parameters that is criteria defining what data types matter or count valuable to the buyer system, data owner details and the like without limitations. The approved data types may be indicative of the data buyer interests in certain entities and types of attributes associated with the entities.

In an embodiment, the buyer system 104a or the buyer may be any participant in the marketplace network 100 who is interested in purchasing the consented data of the user either directly through the marketplace or via the service provider system 106a.

The transactional value of the attributes may differ depending on buyer preferences and valuation criteria for the attributes and the data types. For example, a buyer may approve medical reports for digital purchases; a loan provider may approve bank statements or other economic data and so on. In an example, the buyer system 104a may define the worth of each type of data it may be interested in on the basis of per entity per attribute basis while the value of the attribute may differ from one buyer system to another other buyer system. The buyer system 104a may approve a variety of data types, and each type of data (or data type) may be evaluated for its worth based on the specified criteria. For example, three entities with each of two attributes may be more valuable than one entity and two attributes.

The service provider system 106a may be configured to communicate the user data (authorized for sharing by the user) to the controlling system 112 which may then transfer the authorized data to the buyer system 104a or may make a promise to transfer the data to the buyer system 104a or the controlling system 112 depending on the availability of the data from the user. In an example, when the data is available, the service provider who is already authorized by the user for sharing the user data to the buyer system 104a or anyone else or keep it with it can submit the data to the buyer system 104a directly or through the cloud-based central controlling system 112 which stores the user data received from the service provider system 106a when it is available.

The service provider system 106a may also interact with the third party system 202 such as the insurance agency (and the like without limitations) to calculate the billable transactional value for the services delivered by the service provider as per a user service plan such as a co-pay insurance program. Further, any service charge billed to the user against the delivered services may be paid in the form of the data which is converted into the equivalent transactional value based on calculation of the data worth for the user data authorized for sharing with the buyer system 104a by the service provider system 106a and the amount of data defined as number of entities and number of attributed per entity.

In an example, if the user system 102a gives the user consent to the service provider system 106a, the service provider system 106a may interact with the buyer system 104a via the central controlling system 112 and evaluate the user data worth (also referred to as value of the user data) and inform the user system 102a accordingly. The service provider system 106a may then transmit the user data to a central repository such as an electronic medical record (EMR) system 316 (shown in FIG. 3). The user data may then be allowed to be accessed or extracted for use by the buyer system 104a right after the authorization or may be promised to make a submission to transmit or share the user data to the buyer system 104a or the controlling system 112 for extraction by the buyer system 104a from the central controlling system 112 depending on the availability of the data. In an example, the controlling system 112 may be included as an integral part of the marketplace server 110. In an example, the controlling system 112 may be a separate device and communicatively coupled with the marketplace server 110.

In an example, the user system 102a may be configured as a system or a computing device which is capable of communicating and providing the user consent to the service provider system 106a in the form of a variety of ways. For example, the user system 102a may be configured to provide the consent through a Short Message Service component (SMS), an audio signal, a video signal, a finger print identifier or in any other digitally readable form without limitations that may be input by the user through an interface enabled by the marketplace network 100 platform or by the user system 102a.

In an example, the user system 102a (or the marketplace platform) may include an installable application 206 that may be downloaded within the user system 102a by the user. In an example, the user system 102a may include a graphical user interface (GUI) 208 for operating various menu options and widgets for allowing to perform a variety of tasks causing the user system 102a to interact with the service provider system 106a including such as the authorization for accessing and/or using the user data for further selling or sharing to such as the buyer system 104a. In an example, the variety of tasks may include reviewing credentials of the buyer system 104a through the graphical user interface 208 in the user system 102a and allowing or denying the authorization to the service provider system 106a for data usage rights by the buyer system 104a at least in part. In an example, the user system 102a may be allowed to define criteria for auto-authorization of certain data types for certain types of buyers so that whenever the data is available for the user, the service provider may automatically determine its applicability for authorization based on the criteria defined and accordingly utilize it for submission to the controlling system 112 or the buyer system 104a. In an example, the user may be allowed to provide authorization without even knowing the details of the buyer, in which case the authorized data can be sold to anyone in the marketplace network 100 who is interested in it by the service provider. A notification may be generated for the user to verify once before a final release of the data in some examples.

In some embodiments, the data of the user may not be of a fixed value but may operate according to a bidding facility enabled by the marketplace network 100 such that bidders including such as the buyers may bid for the data and accordingly decide its worth. In an embodiment, the value and worth of the data may be defined based on how many buyers provide similar types of services as transacted for the data and how many buyers are willing to use the data against the delivery of their services. In some embodiments, the same data may be made open to multiple buyers for use such that whoever use the data may have to first take a digital license for particular period of time and the user accordingly receive a perpetual flow of virtual currency till the data and from whosoever the data is being used. In this way, a regular earning keeps on flowing to the user against usage of the digital data by one or more of the networked participants in the marketplace network 100. The marketplace network 100 may establish a formal and secured structure for managing these digital transactions and value flows across the participants.

In an example, the user system 102a may be a mobile device, cell phone, laptop, desktop, or any other type of computer system capable of executing programmable instructions etc. and configured to interact with the marketplace network 100.

Figure 3:
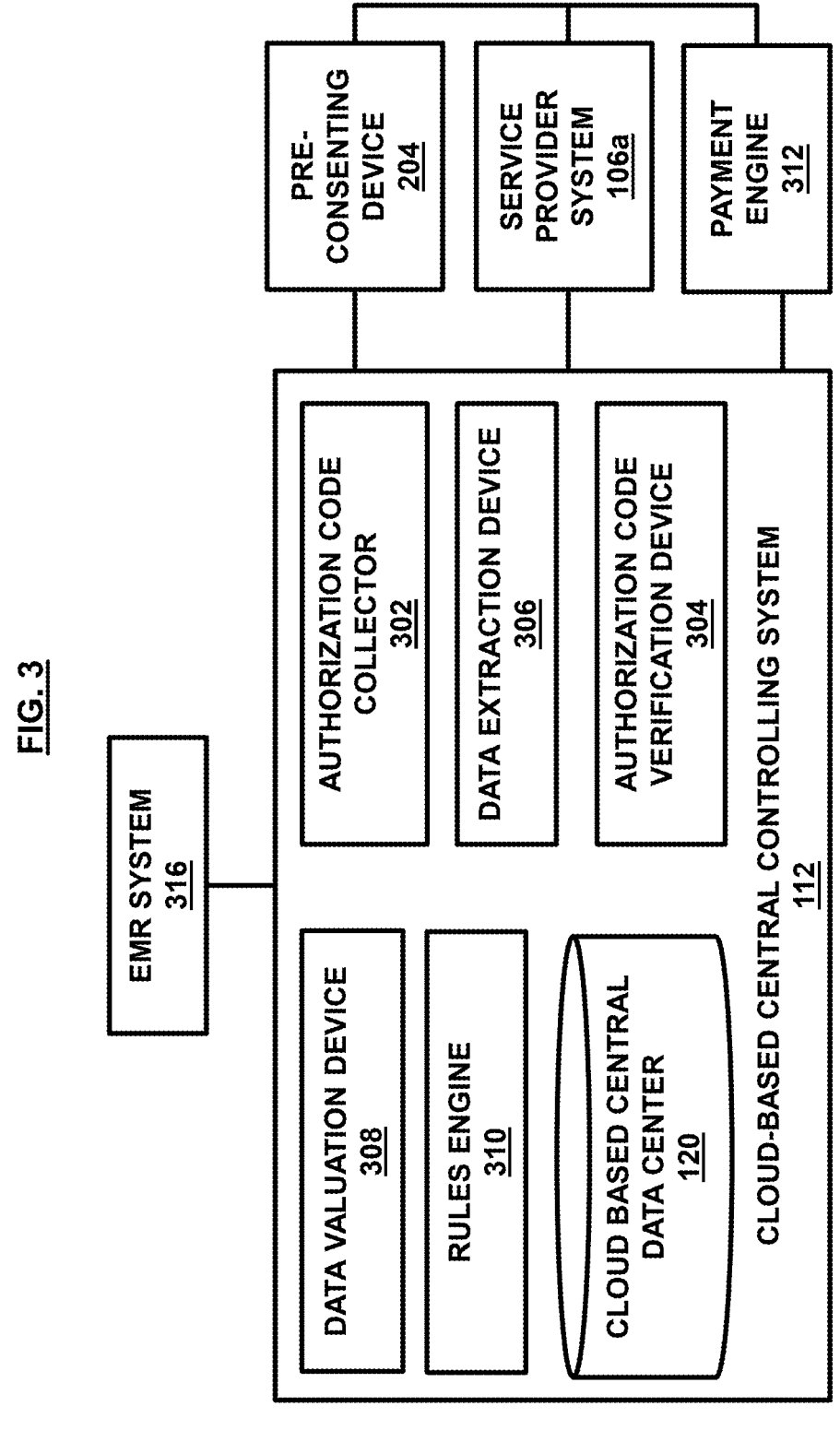
FIG. 3 illustrates a block diagram of a cloud-based central controlling system interacting with a pre-consenting device, a service provider system, among other devices in accordance with an embodiment herein.

FIG. 3, with reference to FIGS. 1 and 2, illustrates a block diagram of the cloud-based central controlling system 112 interacting with the pre-consenting device 204, the service provider system 106a, and the user system 102a. The controlling system 112 may include or be coupled to the cloud-based central data center (or data center) 120, an authorization code collector 302, an authorization code verification device 304, a data extraction device 306, and a data worth valuation device (data valuation device) 308. In an embodiment, all these components may be integrally included within the marketplace server 110 wherein the controlling system 112 is part of the marketplace server 110.

The cloud-based central data center 120 is configured as a central repository which may be used to store the data in the form of computer-executable files. The central data center 120 stores the data in databases in a structured way into different data types to calculate the data worth and for further transmission to the buyer system 104a as and when requested from the buyer system 104a or the service provider system 106a based on the authorization and the availability of the user data stored digitally.

The authorization code collector 302 and the authorization code verification device 304 may together perform verification of the user entity and/or the buyer entity and associate the authorized data along with the services delivered digitally to perform various processing tasks in order to successfully deliver the services to the user and submit the authorized data to the buyer system 104a and/or the service provider system 106a and use the approved data as the transactional value for a payment transaction through the marketplace network 100 instead of making monetary payments for the services delivery. In an example, the authorization code collector 302 and the authorization code verification device 304 may be configured to verify the digital code (or identifier) coming from the user system 102a and from the service provider system 106a to indicate the service provider system 106a that the user is ready to trade the user data against the services requested by the user system 102a to the service provider system 106a.

The data extraction device 306 may be configured to pull the data from the service provider system 106a or the controlling system-managed central data center 120 corresponding to the user that has been authorized for transaction by the user system 102a. The pulled data is then structured into the plurality of data types and is transmitted to the central data center 120 for future actions/references and processing to be taken such as by the data value calculation device or data valuation device 308 and the like. The data extraction device 306 may also be configured to extract data from the central data center 120 stored in the form of the computer-executable files and transmit them to the buyer system 104a as and when requested or made available by the service provider system 106a. The data extraction device 306 may be configured to extract and supply to the buyer system 104a or the service provider system 106a only those computer-executable files that belong to the user and contain the authorized data only. Any data from other than the user who provided the consent and any data that is not authorized by the user but belong to the user may be stored as separate computer-executable files or referenced separately so that it does not get extracted and supplied to the buyer system 104a from the central data center 120.

The data worth calculation device or data valuation device 308 is configured to calculate the data worth based on the predefined criteria and preferences provided by the buyer system 104a and stored in a rules engine 310 contained within the controlling system 112. The data worth valuation device or data valuation device 308 may be configured to calculate and assess the data worth by using a preset algorithm stored in the rules engine 310 which is governed by a set of rules (predefined criteria and preferences) provided by the buyer system 104a.

In an example, the system 200 may be configured as a computer-controlled payment system for facilitating seamless transactions from the user system 102a to the buyer system 104a through an intermediary system such as the service provider system 106a using the authorized data as the transactional value for performing digital transactions instead of the currency enabled through the digital marketplace network 100 of the participants and their associated systems located at various remote places globally. The marketplace server 110 may include or be coupled to the marketplace interaction component 124 to generate an electronic signal transmitted to the user system 102a using a transmission circuit. The electronic signal may allow communication between the user system 102a and the service provider system 106a such that the marketplace interaction component 124 allows to collect predefined information about the user system 102a and the associated user. The predetermined information may include without limitations such as a first computer-executable input indicative of an identifier of the user system 102a and the associated user, and a second computer-executable input indicative of a service sought for delivery in the service setting by the service provider. The service setting can be a physical place where the service provider and the user meet or an online transaction through the digital marketplace network 100 only.

The marketplace server 110 may include or be coupled to a payment engine 312 for processing payments digitally based on the data worth associated with the data owned by the user and authorized for sharing by the service provider to the buyer system 104a. The payment engine 312 may be configured to calculate a payable amount payable digitally by the user to the service provider based on a first digital transactional value indicative of a service charge for the service delivered digitally by the service provider, a second digital transactional value indicative of a predefined co-pay between the user and a co-pay entity such as the third party (insurance agency), and a third digital transactional value indicative of the data worth associated with the data owned by the user and authorized for sharing. As discussed above, the data worth may be calculated based on a set of predefined criteria specified by the buyer entity for a set of data types, data entities and data attributes by the data valuation device 308 which may be coupled to the payment engine 312.

The pre-consenting system 204 may be located remotely from the user systems 102 in the service setting and may be configured to collect a third computer-executable input indicative of an authorization for sharing the data owned by the user at least in part toward the digital purchase of the service from the service provider by the user such that the data owned by the user (approved data) serves as the transactional value for the digital purchase of the service as and when the data is made available to the service provider system 106a-right away during the payment transaction in terms of the approved data or at a later time.

The pre-consenting system 204 may be further configured to generate a trigger that is initiated upon electronic receipt of the third computer-executable input by the pre-consenting system 204. The trigger may include a unique code referencing the user, the user system 102a and the authorized data of the user for storage, processing, and sharing of the authorized data.

Figure 4:
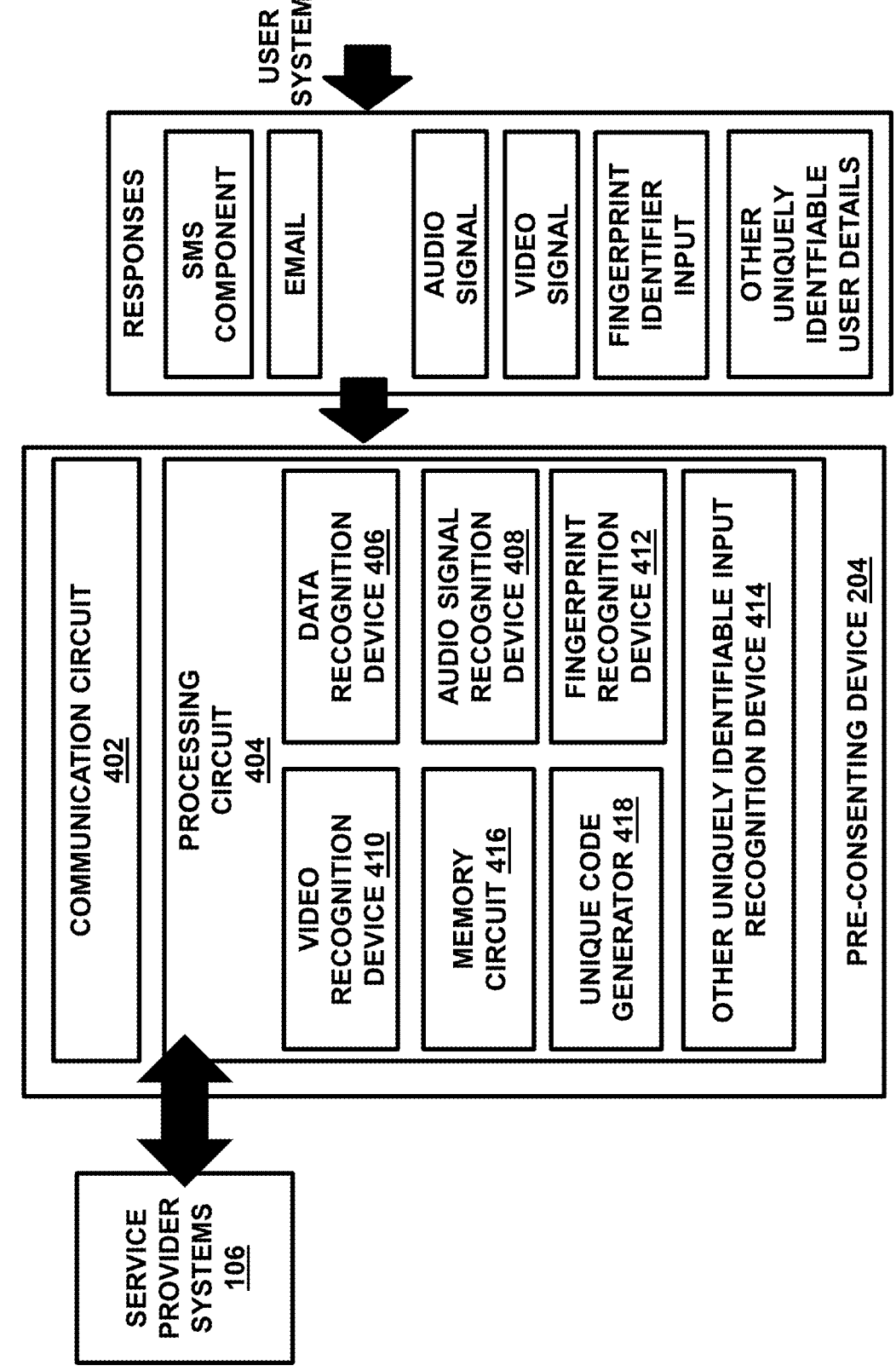
FIG. 4 illustrates a block diagram of a pre-consenting device in accordance with an embodiment herein.

FIG. 4, with reference to FIGS. 1 through 3, illustrates a block diagram of a pre-consenting device such as the pre-consenting device 204 shown in FIG. 2. The pre-consenting device 204 includes a communication circuit 402 and a processing circuit 404. The processing circuit 404 may further include a data recognition device 406, an audio signal recognition device 408, a video signal recognition device 410, a fingerprint recognition device 412, other uniquely identifiable input recognition device 414, a memory circuit 416 and a unique code generator 418. In an example, the pre-consenting device 204 be coupled to or included as an integral part of the marketplace server 110.

The processing circuit 404 may be configured to process the data coming from the user systems 102 as a response to the request made by the service provider system 106a for the authorization of the data usage against the service charge provided by the service provider system 106a instead of paying with cash or other form of conventional currency either digitally or non-digitally. In another scenario, the user systems 102 may voluntarily authorize the service provider system 106a to use the data against the services instead of waiting for the request from the service provider.

The unique code generator 418 may be configured to generate a unique code (identifier) for the user systems 102 (such as the unique code mentioned above created when the trigger is initiated) by recognizing the user systems 102 response with the help of various recognition devices present in the pre-consenting device 204 as mentioned and discussed later below. In an example, the unique code generator 418 may be programmed to generate a random number or a checksum or a cryptographic code using randomization function or checksum function or cryptographic hash function accordingly. The unique code generated may be used as the user systems 102 identifier for any future transaction or processing or referencing. The user systems 102 may use the unique code as an authorization token for the usage of user data against the services provided by the service provider system 106a instead of paying with currency.

The communication circuit 402 may be configured to establish a communication channel to and from the pre-consenting device 204 and/or the service provider system 106a. The communication circuit 402 may allow communication between different systems as shown in the FIGS. 1 through 4 by establishing either a physical transmission medium or a logical connection over a multiplexed medium such as a radio channel in telecommunications and computer networking or any other modes without limitations. Communication circuits are characterized by specific standard criteria, such as the frequency bandwidth and information transmission rate, etc.

The data recognition device 406 in the processing circuit 404 of the pre-consenting device 204 may be configured to recognize and capture unique data (information) about the user systems 102 and the user, the authorization response is coming from. The data recognition device 406 may be any programmable electronics device which recognizes and captures the basic information such as phone number, email address etc. associated with the user systems 102 or the user and serve as an input for initializing payment methods according to embodiments.

In an example, the authorization from the user systems 102 may arrive in the form of an SMS (Short Messaging Service Component). The data recognition device 406 may recognize the phone number of the device used for sending the SMS and store it somewhere in an internal memory or a separate memory circuit 416. The phone number may directly be transmitted to the service provider system 106*a* which may be used as a proof of consent or the unique code generator 418 may generate a unique code such as the code mentioned above for the associated phone number which may be used as the authorization token for the user systems 102 for usage/sharing of the approved data against the services provided by the service provider system 106*a* in return of the authorized data instead of paying with currency digitally or non-digitally.

In an example, the user systems 102 may provide the user consent through email. The service provider system 106*a* may use the email address as a proof of consent after verification or may route it to the unique code generator 418 to generate the unique code which may be associated with the user systems 102 as the authorization token for the usage of data against the services provided by the service provider system 106*a* instead of paying with conventional currency forms digitally or non-digitally.

The audio signal recognition device 408 may be configured to recognize an audio signal coming from the user systems 102. The recognition process may be performed by using statistical models that may output a sequence of symbol or quantities by breaking the input audio signal into piecewise stationary signal and comparing them with piecewise stationary signals of the audio signal present in the service provider system 106*a* in a database such as the central data center 120. In another scenario, the recognition device may convert the audio signal coming from the user systems 102 into textual form and transmit it to the controlling system 112 through the communication circuit 402 which may use it as token of consent to use the user data as the transactional value for the digital purchase and delivery of the services.

The video signal recognition device or video recognition device 410 may be configured to recognize a video signal coming from the user systems 102. The recognition process may be performed by using statistical models that may output a sequence of symbol or quantities by breaking the input video signal into piecewise stationary signal and comparing them with piecewise stationary signals of the audio signal present in the service provider system 106*a* in a database such as the central data center 120, in an embodiment. In one scenario, the video recognition device 410 may convert the video signal coming from the user systems 102 into textual form and transmit it to the controlling system 112 through the communication circuit 402 which may use it as token of consent to use the user data as the transactional value for the digital purchase and delivery of the services.

In an exemplary embodiment, the pre-consenting device 204 may be configured as a programmable RF (radio frequency) device reader without limitations which may be configured to capture the user systems 102 response and record it for later use as the authorization input. The pre-consenting device 204 may be programmed to generate a random number or a checksum or a cryptographic code using randomization function or checksum function or cryptographic hash function accordingly. The cryptographic code (say the authorization token) may then be transmitted by the pre-consenting device 204 to the service provider system 106*a* and to the controlling system 112.

Figure 5:
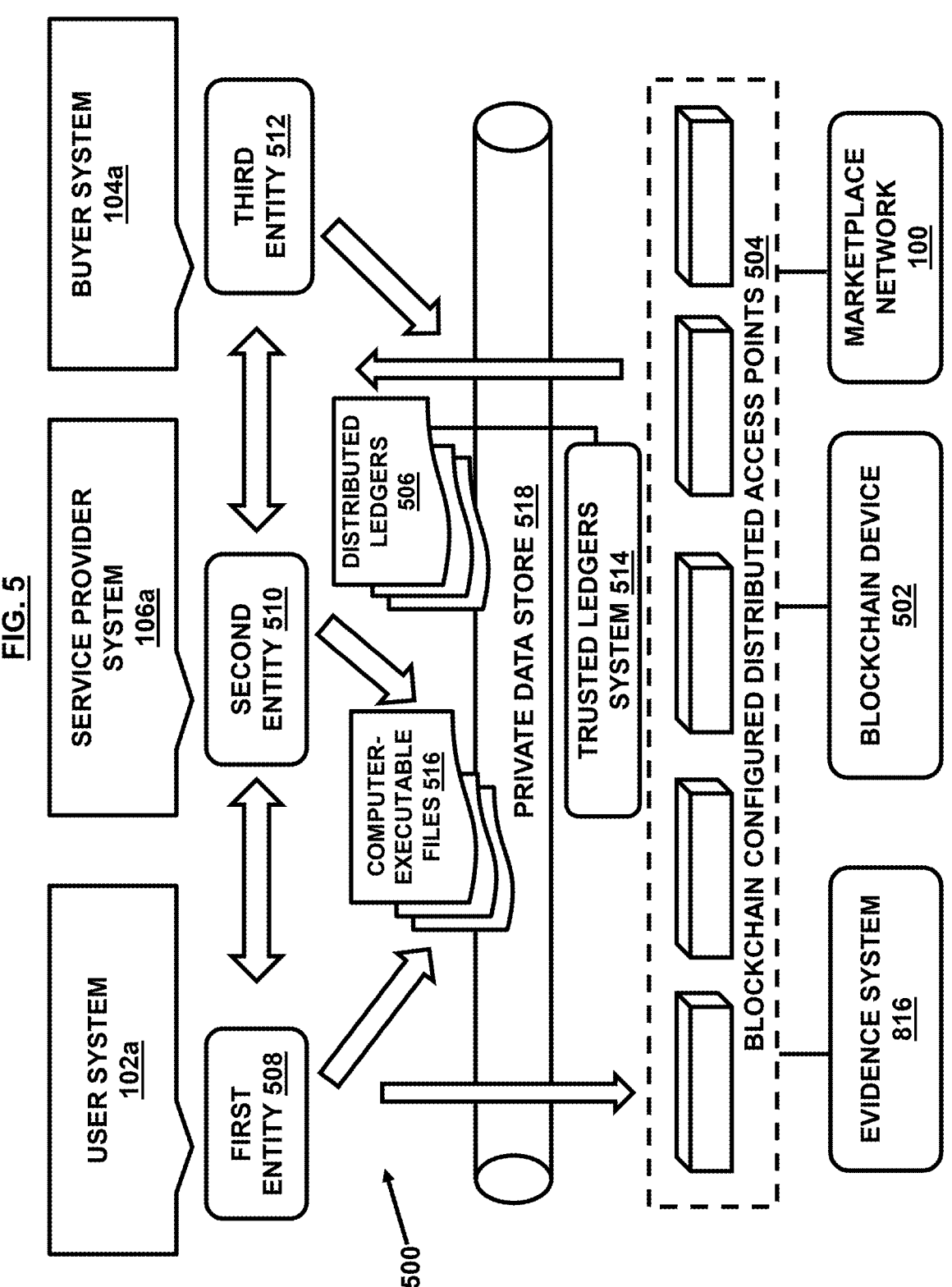
FIG. 5 illustrates blockchain computer architecture of the system of FIG. 1 along with other systems in accordance with an embodiment herein.

FIG. 5, with reference to FIGS. 1 through 4, illustrates a blockchain computer architecture of the system 200 of FIG. 2 enabled through the marketplace network 100 along with other systems and components in accordance with an embodiment herein. More particularly, FIG. 5 illustrates an exemplary blockchain configured ecosystem architecture 500 containing one or more components of the system 200 as discussed in conjunction with FIG. 2 for operating the marketplace network 100, and also contains additional components so as to allow integrity of transactions and the data processed during the service delivery as discussed above. The blockchain configured ecosystem architecture 500 may provide a crowdsourced integrity network for storing the data authorized for sharing by a user along with other users and service details instead of locally stored information by different participants that may be tempered.

The ecosystem architecture 500 may be blockchain configured involving various blockchain devices. For example, the user system 102*a*, service provider system 106*a*, and the buyer system 104*a* may all interact with a blockchain device 502 through a plurality of blockchain configured distributed access points 504 over the marketplace network 100 configured for blockchain capabilities. A network that facilitates interaction across all components may be a blockchain integrity network. The blockchain network may build trust among the various participants or entities and their associated computing terminals or devices even if the devices/terminals etc. may not know one another. The blockchain network may allow connections and transactions and recording and sharing of the data and various codes/token generated during an entire transaction including service tokens and authorization tokens in a trusted mode. A record of transactions and sharing and data from various terminals/devices stored on the blockchain in the form of computer-executable distributed ledgers 506 may provide proof to command the necessary trust among the terminals/devices (such as those associated with various participants including a first entity 508 such as the user, a second entity 510 such as the service provider, and a third entity 512 such as the buyer) to cooperate through a peer-to-peer or peer-to-client distributed digital ledger technology over the marketplace network 100. The ecosystem architecture 500 may include a distributed trusted ledgers system 514 containing the distributed blockchain ledgers 506 associated with a plurality of computing terminals and devices such that each ledger stores a copy of computer-executable files 516 containing the authorized data corresponding to the user for the service delivery and the trust notes for defining security and trust among the computing terminals and devices across the network so that each computing terminal trusts the other computing terminal through the blockchain. The distributed trusted ledgers system 514 enables coding of rules-based contracts that execute when specified conditions are met. The distributed blockchain ledgers 506 make it easier to create cost-efficient networks where any device or any evidence associated with a service delivery or data authorization or payment transaction may be tracked, without requiring a central point of control.

The various computing terminals or devices in the network serve as distributed peer-to-peer nodes and connections. The payment engine 312 may serve as a client device configured to perform the task of processing payments through the blockchain network over the marketplace network 100 based on the rules as defined based on the calculated worth of the data and the service charge and other details as necessary and defined by the rules engine 310. Each terminal/device/node in the ecosystem architecture 500, etc. may get a copy of the blockchain which may get downloaded automatically upon joining the blockchain integrity network. Every node or the device in the network is an administrator of the blockchain, and may join the network voluntarily so that the network is decentralized.

The blockchain may eliminate the risks that come with data being held centrally by storing data across the network which may include the computer-executable files containing the authorized data and/or the various tokens/codes including payment transaction codes. The blockchain security uses encryption technology and validation mechanisms for security and integrity verification. The security may be enabled through public and private keys. A public key may define a user's address on the blockchain. The private key may give its owner an access to various digital assets in the network.

In an embodiment, the distributed blockchain ledgers 506 may enable coding of smart contracts within the marketplace network 100 that will execute when specified conditions are met. These smart contracts may protect various information pieces associated with the service deliveries and payment transactions and data processing/storage and eliminate the risk of files copying and redistribution without protecting privacy rights over the marketplace.

The blockchain configured ecosystem architecture 500 may provide a private view for the various devices and the entities operating in the network through the private data store 518 so that each such device may privately access the computer-executable files 516 associated with a service delivery based on various policies such as based on their respective identities. Each of the devices may access the computer-executable files 516 through the dedicated private store 518 available through the plurality of distributed blockchain configured access points 504 which may be enabled in the form of distributed blocks as shown in FIG. 5, with each block providing a facility to access the features of the blockchain configured ecosystem architecture 500 by different terminals and devices at the same time based on defined and granted access rights.

The private data store 518 may provide a virtual storage to facilitate interaction, information exchange, reviewing, and presentation of the computer-executable files 516. For example, the private data store 518 may allow a virtual storage and presentation of only limited executable files or portions of the executable files for access by particular nodes in accordance with permissions granted for reviewing. The private data store 518 may be configured to auto-hash review interactions at any required interval. This compartmentalization of the computer-executable files 516 ensures that the computer-executable files 516 are secured and private as per access rights authorized to the nodes. The data presented on the private data store 518 of the blockchain serves as a secure way to ensure that the private data store 518 is in sync with any permissioned access.

In embodiment, the user system 102a, the service provider system 106a, and the buyer system 104a may be allowed to access discrete portions of data elements including the computer-executable instructions stored within the blockchain device 502 based on access rights through respective blockchain access points such that an access to the data elements allows one or more of viewing, locally replicating, and digitally sharing the data elements at least in part.

In an embodiment, the blockchain configured digital ecosystem architecture 500 may provide a federated blockchain comprising of several entities/participants within the marketplace network 100 and their associated computers and devices and sensors that jointly interact to process transfers of data through a trusted, secured and distributed network of the blockchain configured access points 504.

In accordance with various embodiments, the service setting may be defined based on various parameters. For examples, the service setting may be defined by a particular geo-location such as through latitude and longitude values. In an embodiment, the service setting may be defined through geo-fencing. Geo-fencing (geofencing) may allow a software program and associated hardware to use a global positioning system (GPS) or radio frequency identification (RFID) device to define geographical boundaries that may be indicative of the service setting.

Geo-fencing may allow an administrator to set up triggers so that when a device such as the user system enters (or exits) the boundaries defined by the administrator through geo-fencing, an alert may be generated or the trigger may be generated for initiation or closing of the service.

In an embodiment, the service setting may be defined based on either of the first entity and the second entity to be proximate to the other entity. The proximity may be associated by pre-defined location coordinates or geographical barriers or distance values. For example, if an entity enters within a radius of 30 yards of the other entity, the two entities may be considered proximate enough to be considered within the service setting at the same time. The geographical boundary in this case may be a 30-yard radius, as an example. The service setting in this case may be identified by either of the entities to enter within the geographical boundary. For example, if one entity moves proximate to the other entity, the service setting may be defined. The service setting may be defined as long as both the entities are within the geographical boundary in accordance with the pre-defined location coordinates or the geographical barriers or the distance values.

In an embodiment, the service setting may be defined only over the marketplace network in a digital format such that the services can be purchased and delivered through the marketplace network 100 platform online without any need of visiting a service facility in person physically. In such cases, the service setting may need not be defined as a physical location.

In an embodiment, the service setting may be defined over the marketplace network 100 in a digital format such that the services can be booked through the marketplace network 100 online but can be availed by visiting a service facility in person physically.

In an example, the various participant systems in the marketplace network are in communication with one another over a peer-to-peer communication network that maintains the decentralized blockchain ledgers 506 for tracking and recording the transactional exchanges and ownership trails. Each of the participant systems may include at least one processing circuit and at least one physical storage medium that stores at least a portion of the decentralized blockchain ledgers 506 comprising a distributed database or private data store 518 to record transactional information associated with a transactional exchange that occur on the peer-to-peer communication network between at least two of the participants systems.

Figure 6:
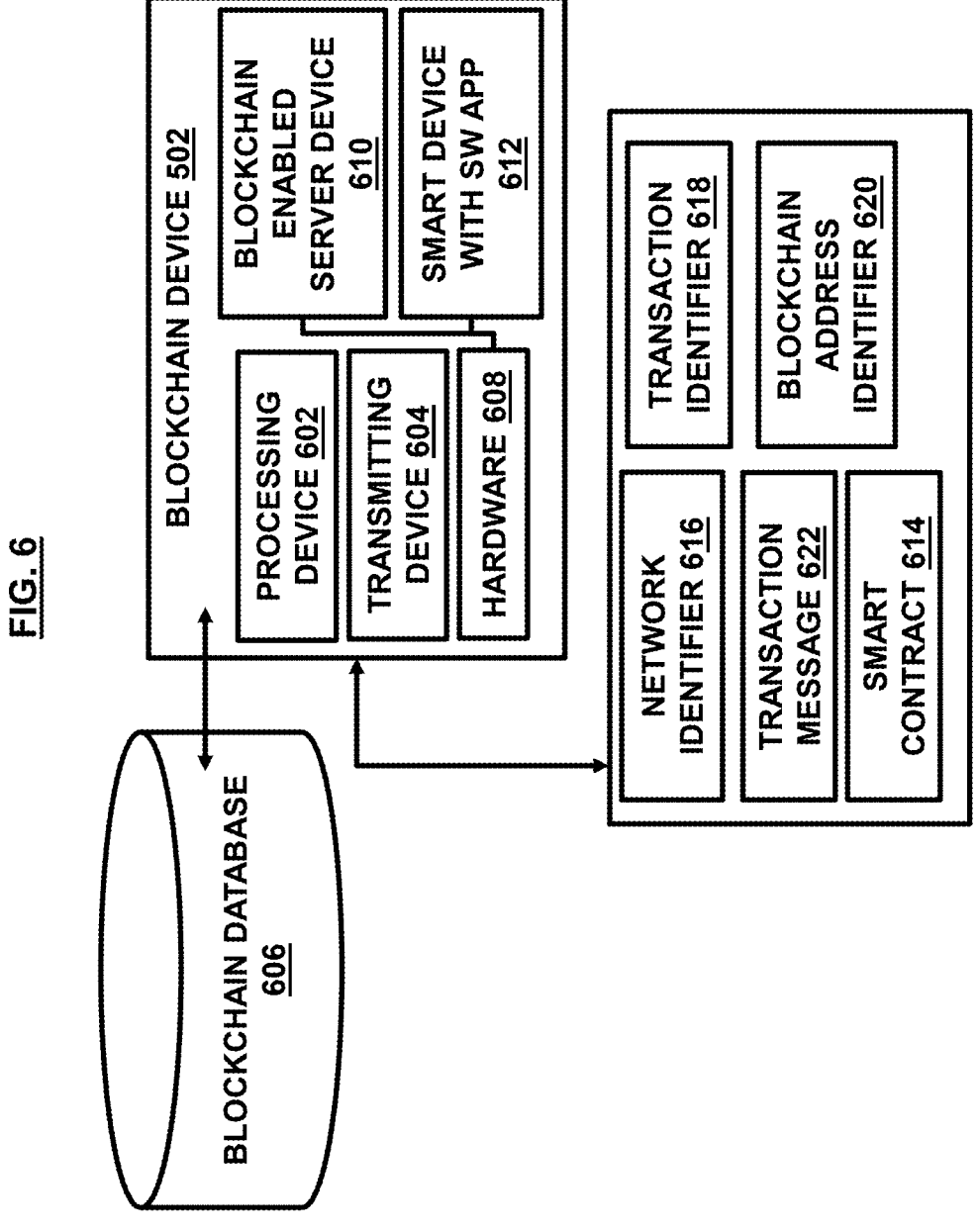
FIG. 6 illustrates an exemplary blockchain device in accordance with an embodiment herein.

FIG. 6, with reference to FIGS. 1 through 5, illustrates a block diagram of an exemplary blockchain device such as the blockchain device 502. The blockchain device 502 is configured to automatically store computer-executable instructions such as the digitally executable tokens pertaining to authorization and payment as discussed above transacted over the marketplace network 100 by one or more of the participants connected over the marketplace network 100.

The blockchain device 502 may include a processing device 602 and a transmitting device 604 that each is capable of blockchain integration unlike generic devices. The processing device 602 may process all blockchain tasks through computer-controlled software and hardware tools. The transmitting device 604 can allow transmission of information such as the computer-executable files from the central data center 120 which may be configured as a blockchain database 606 to the buyer system 104a or the controlling system 112 based on permissions and access rights. The transmitting device 604 may also enable various types of communication with other systems.

The blockchain device 502 also includes hardware 608. The hardware 608 may comprise a specific blockchain-enabled server device 610 and a smart device 612 running a specific dedicated software application. The smart device 612 is configured to engage in specific communication with the blockchain-enabled server device 610. The smart device 612 is configured to receive inputs from the user and generate transaction identifiers based on the received inputs such that the transaction identifiers enable processing and generating of a smart contract 614 within the blockchain that may involve authorization and payment processing without limitations based on the services delivered as well as the worth of the authorized data. The smart contract 614 cannot be tampered with from any sort of vulnerability within the blockchain. The smart device 612 may be coupled to a user interface that allows the user to input details.

The blockchain-enabled server device 610 performs tasks enabling communication with the smart device 612. The blockchain-enabled server device 610 further performs at least one of these tasks: storage of at least one database or a portion thereof and/or data for placement therein in the blockchain database 606, access the at least one database including the blockchain database 606, update the at least one database including the blockchain database 606, allow the smart device 612 to access and receive information in whole or in part from the at least one database. In some embodiments, the at least one database such as the blockchain database 606 may contain at least one unique hash, at least one timestamp of the at least one unique hash, and/or other data for generating the smart contract 614.

The transmitting device 604 may allow transmission of at least one hash file and/or hash blockchain to the blockchain-enabled server device 610. The transmitting device 604 may further allow receiving a transaction confirmation and/or identifier from the smart device 612, creating a hash file and/or hash blockchain from the digital data and/or digital content, receiving the hash file and/or hash blockchain and the timestamp from the smart device 612. The processing device 602 may compare the hash file and/or hash blockchain to other verification information for verifying authenticity of a variety of information flowing across the marketplace network 100.

The processing device 602 may generate a network identifier 616, a transaction identifier 618, and a blockchain address identifier 620 to specify a particular transaction in the marketplace network 100 that involves such as receipt of a service associated with the user, enabling a payment corresponding to a service, submitting a workflow task, receiving responses for a particular workflow task of the service and other types of transactions. Each set of identifiers define a specific marketplace network 100 transaction indicated through a digital contract such as the smart contract 614 and cannot be tampered. The smart contract 614 allows tracing evidence of the transactions for any particular task. In an embodiment, the processing device 602 is configured to cause the smart contract 614 to be generated based on the network identifier 616, transaction identifier 618, and the blockchain address identifier 620 such that the smart contract 614 is configured to automatically validate a transaction using a special key associated with a user or a transaction.

A transaction message 622 may be generated by the processing device 602 to inform respective users. In an embodiment, the transaction message 622 may be associated with one or more secured hashlinks so that the transaction message is generated when the one or more secured hashlinks are activated.

The processing device 602 may generate the network identifier 616 that may be associated with the blockchain and the transaction ID (identifier) 618. The processing device 602 may generate the blockchain address identifier 620 using at least a unique key and one or more hashing codes associated with the respective user.

In an embodiment, the blockchain address identifier 620 may be based on a public key corresponding to a private key that was used to register the transaction on the blockchain such that the public key and the private key are part of a public/private key pair associated with the marketplace network 100 transaction (alternatively referred to as transaction) indicative of the execution of a particular workflow task of the service.

In an embodiment, the processing device 602 may generate the transaction message 622 based on one or more standards and includes a plurality of data elements, including at least a first data element configured to store a proof of transaction as the evidence reserved for private use upon request for verification by respective associated users. The use of evidence privately is indicative of a controlled and secured access of the evidence only to authorized users.

The blockchain device 502 may include or is coupled to the rules engine 310 that defines and facilitates processing of a set of computer-executable rules defining instructions for verification of identity information of the user system 102a and the associated user. The computer-executable rules may allow verifying identity of the user and the user system 102a. The rules engine 310 may include or be coupled to a memory circuit, a processing circuit, integrated circuits, chipsets, and rules translators (not shown). The rules engine 310 includes at least one rule that allows identifying the user and verification information of the user to consider authorization for the data owned by the user for sharing with the buyer system 104a. The blockchain device 502 may be accessed through an interactive graphical user interface such as the GUI 208 for interactions and engagement.

In an example, the marketplace server 110 may function as a merchant acquisition system for facilitating acquisition of an item or a service such as the service discussed above in the digital marketplace network 100. An exemplary merchant acquisition system 702 shown in FIG. 7, with reference to FIGS. 1 through 6, includes a merchant server 704 communicatively coupled and associated with a service provider system such as the service provider system 106a. The merchant server 704 comprises a processor 706 and a physical storage medium 708 that stores merchandise information and transactional information associated with the service provider system 106a. The processor 706 may be configured to define a set of digitally recognizable data valuation parameters for one or more entities and attributes associated with tradable data originally stored at a user system such as the user system 102a remotely located from the merchant server 704. The processor 706 may publish the set of digitally recognizable data valuation parameters defined by the service provider system 106a in the marketplace network along with digitally listed one or more offerings such as the offerings discussed above. The processor 706 may allow transacting for an offering with a user participant associated with the user system 102a with data ownership transfer for the data at least in part owned originally by the user participant and valued at a transactional value no less than value of the offering calculated in accordance with the set of digitally recognizable data valuation parameters defined by the service provider system 106a.

The merchant acquisition system 702 may include or be coupled to a buyer server 710 (similar to the buyer server 128) located remotely from and communicatively coupled with the merchant server 704. The buyer server 710 may be associated with a respective buyer participant, such that the transactional value for the offering is defined by the merchant server 704 based on an input received from the buyer server 710. An ownership trail of the data ownership transfer for the data at least in part includes at least a transfer of the ownership from the user participant to the service provider participant, and from the service provider participant to the buyer participant either in real-time or deferred for a later time than when the acquisition of the item is performed. In an embodiment, the service provider participant may itself be a consumer or purchaser of the tradeable date such that it may function as a buyer participant and may define all guidelines that otherwise a buyer participant does.

The merchant server 704, the buyer server 710, and the user system 102a are in communication with one another over a peer-to-peer communication network that maintains a decentralized blockchain ledger similar to the ledger discussed above for tracking and recording the acquisition of the item and the ownership trail. Each of the merchant server 704, the buyer server 710, and the user system 102a each includes at least one processing circuit and at least one physical storage medium that stores at least a portion of the decentralized blockchain ledger comprising a distributed database to record acquisition information associated with the acquisition of the item that occur on the peer-to-peer communication network between at least two of the merchant server 704, the buyer server 710, and the user system 102a.

In the marketplace network 100, there can be an arbitrarily large number of merchant servers similar to merchant server 704 associated with respective service provider systems 106, each publishing one or more digital offerings in the marketplace network 100 tradable in return of ownership transfer of one or more data files from an arbitrarily large number of computer-executable data files. Each of the computer-executable data files is owned originally by a user participant from an arbitrarily large number of user participants associated with respective user systems 102 and communicating with one or more of the merchant servers over the marketplace network.

The merchant server 704 may enable a cryptographic wallet 712 to reflect equivalent transactional value of the computer-executable data files owned originally by the user participant and marked by the user participant for trading in the marketplace network 100. The one or more computer-executable data files include the tradable data that may be transacted in return of the offerings.

The cryptographic wallet 712 may provide one or more acquisition-driven smart contracts such as the smart contracts discussed above that enable security of the transactional information among various transacting participants. The cryptographic wallet 712 may be configured to append blocks to the decentralized blockchain ledger 506 with every acquisition which may enable recording of the transactional information across many systems associated with the network participants so that any involved information cannot be altered.

In an example, the acquisition of the item may include delivery of the offering or the service to the user participant by the merchant server 704 and transferring of the data to the merchant server 704 by the user system 102a at the time of the acquisition. The transferring of the data to the merchant server 704 may include modifying access privileges for the merchant server 704 so as to allow the data to be accessed by the merchant server 704, and/or sharing access credentials of a secured repository containing the data to the merchant server 704 for allowing access to the data by the merchant server 704.

In an example, completion of the entire transaction may be deferred to a later time. For example, the delivery of the offering to the user participant by the merchant server 704 may occur at the time of acquisition of the item and the transferring of the data to the merchant server 704 may be delayed by the user participant system for a later specified time depending on availability of the data with the user participant system.

In an example, the set digitally recognizable data valuation parameters may include parameters such as type of the data, length of the data, source of the data, number of entities contained in the data, and number of attributes associated with each of the entities and the like.

Figure 8:
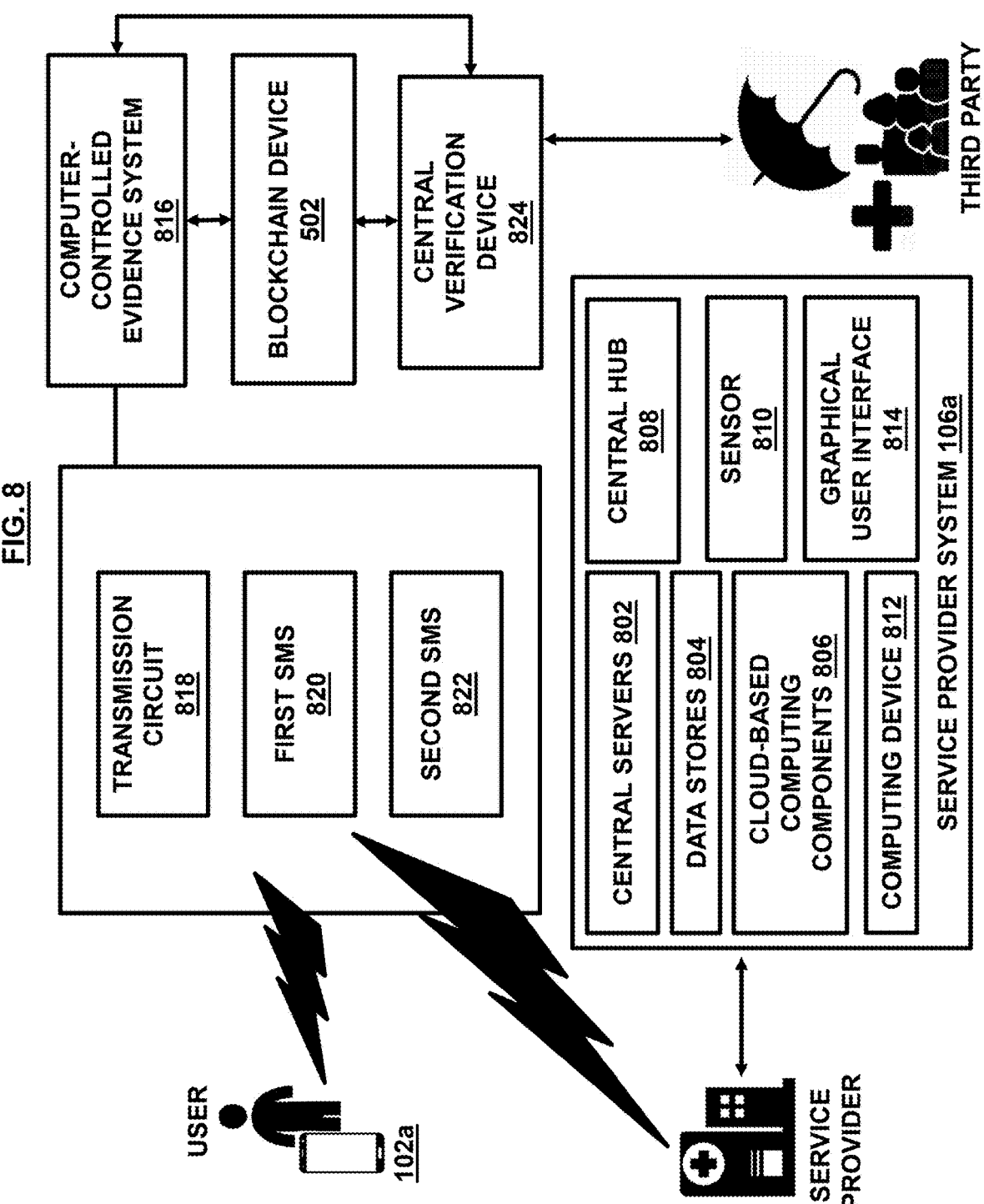
FIG. 8 illustrates a scenario for facilitating recording of an evidence of a service delivery by an evidence system according to an embodiment herein.

FIG. 8, with reference to FIGS. 1 through 7, illustrates generally, but not by way of limitation, among other things, a scenario in which various participants of the marketplace network 100 may interact in accordance with an embodiment so as to record evidence of a service delivery. This is particularly important when the service is availed at one time, but the data transfer or data rights ownership transfer happens later due to non-availability of data at the time of service delivery. The marketplace network 100 may be a digital marketplace in an embodiment. In some embodiments, the marketplace network 100 may involve a physical setting for allowing one or more participants to interact physically. In accordance with various embodiments, a variety of service settings may be employed for applying teachings of the embodiments herein in various embodiments.

The first entity (referred to as the user) is associated with a smart-capability device such as a smart phone or a mobile phone or any other device referred to as the user system 102a and configured to perform certain functions as described herein. For the purposes of describing the embodiments herein, a mobile communication device may be used as the user device or the user system 102a associated with the user in an embodiment without limitations.

The user system 102a may be located proximate to the first entity (also referred to as the user interchangeably). The second entity (referred to as the service provider interchangeably without limitations) may be associated with the service provider system 106a. The service provider system 106a may include one or more central servers 802, data stores 804, and cloud-based computing components 806 for digitally managing and processing computer-controlled delivery of the services in the service setting by the service provider to the user associated with the user system 102a or the user device 102a in general.

In an embodiment, the service provider system 106a may be configured as a cloud-based service provider system 106a that may be connected with the marketplace server 110 and/or the merchant server 704. The cloud-based service provider system 106a may further include a central hub 808 to communicate over wired and wireless connections with different elements of the service provider system 106a and associated data stores 804. The cloud-based service provider system 106a includes a sensor 810 in wireless bi-directional communication with the central hub 808 to allow sensing of various service delivery parameters. The cloud-based service provider system 106a may also include a computing device 812 in bi-directional communication with the central hub 808. The computing device 812 may include a graphical user interface 814 to allow display of data received from the sensor 810 and/or other electronic devices such that the second entity or the user with permissions may control the delivery of services through the graphical user interface 814. The various devices and components of the service provider system 106a allow delivery of the services by the second entity to the first entity in a computerized manner.

A plurality of wireless and/or wired communications that enable real-time information sharing, constant availability, and interoperability are used in the service setting for allowing delivery of the services. Additionally, greater situational awareness is facilitated to allow transparency through live video, voice communication, sensor, and location data information.

The embodiments herein allow recording of the evidence digitally in a computer-executable format with the use of a computer-controlled evidence system 816 for automated recording of the evidence of the service delivery within the service setting. The computer-controlled evidence system (also called as recording system interchangeably without limitations) 816 may be coupled to the marketplace interaction component 124 or the marketplace server 110, located remotely from the user system 102a, to collect predefined information about the user system 102a and the associated user networked over the marketplace network 100. In an embodiment, an evidence system similar to the computer-controlled evidence system 816 may be associated with or included within each of the service provider systems 106 so that when a service is delivered with respect to a particular service provider system, the associated evidence system may record evidence accordingly.

The predefined information collected by the computer-controlled evidence system 816 or simply system 816 includes at least a first computer-executable input indicative of an identifier of the user system 102a and the associated user, and a second computer-executable input indicative of a service sought for delivery in the service setting by the service provider system 106a to the user system 102a. For example, the identifier of the user system 102a can be a unique code of the user system 102a or a unique subscriber identity module or subscriber identification module associated with the user system 102a. A trigger is initiated by the computer-controlled evidence system 816 or the service provider system 106a upon receipt of the first computer-executable input and the second computer-executable input from the user system 102a. The trigger causes entry of a registration of a service request in the service provider system 106a for delivery according to a set of defined service rules. In an embodiment, the trigger can be generated, and the entry can be made automatically when a request is booked form the marketplace network 100. The trigger may be a signal that causes initiation of a registration request or a submission of a registration form for the user associated with the user system 102a and the like.

The trigger initiated upon receipt of the first computer-executable input and the second computer-executable input may serve as a registration request for the user and a registration request may be entered into the system of the service provider such as the service provider system 106a in a digital format accordingly. Registration details may be sent to the user and the service provider through either an email or SMS or any other medium.

The computer-controlled evidence system 816 is coupled to the marketplace server 110. The computer-controlled evidence system 816 generates an electronic signal that may be transmitted to the user system 102a and the service provider system 106a using a transmission circuit 818. The electronic signal may include and/or convey a first short message service component (first SMS) 820 and a second short message service component (second SMS) 822. The request for the registration may however be rejected if the service provider system 106a for example detects unauthorized use of the user system 102a by an entity other than the user; e.g., through fingerprint or retinal scan, etc. Also, the user may terminate the registration request on the user system 102a due to any number of reasons.

The computer-controlled evidence system 816 may generate the electronic signal to send the first SMS to the user system 102a when a trigger is activated in the service setting that represents registration of a request by the user for a predefined service. The first SMS 820 sent by the computer-controlled evidence system 816 is indicative of start of a service, in an embodiment. In an embodiment, the first SMS 820 may indicate approval of the registration which leads to start of the service.

In an embodiment, when the first SMS 820 is sent to the user system 102a, it may be considered as a signal that the service is ready for delivery to the user but may not necessarily indicate completion of the service. However, in some embodiments, the first SMS 820 can indicate that the service was initiated and completed as well successfully. In such situations, a separate SMS for service delivery may not be sent to the user system 102a.

In embodiments, the computer-controlled evidence system 816 may send the second short message service component (SMS) 822 to the service provider system 106a upon activation of the trigger in the service setting. The second SMS 822 is indicative of the start of the service and is configured to be sent to the service provider system 106a unlike the first SMS 820 which is sent to the user system 102a associated with the user who seeks the service. In some embodiments, the first SMS 820 and the second SMS 822 can be sent at the same time from the computer-controlled evidence system 816. In an embodiment, the service provider system 106a may control operation of the computer-controlled evidence system 816. In an embodiment, an external agency not related to the service provider system 106a can control the computer-controlled evidence system 816 for independence, reliability, and trustworthiness. In an embodiment, the marketplace network 100 may control functioning of the computer-controlled evidence system 816.

In an embodiment, the first SMS 820 contains a first secured hashlink that is executable by the user system 102a or the associated user. In an embodiment, the first secured hashlink may be sent separately and not within the first SMS 820. In such cases, the computer-controlled evidence system 816 may generate a separate signal so that the signal may transmit the first secured hashlink to the user system 102a for processing through any of the ways including through an SMS.

Executing the first secured hashlink such as by clicking the first secured hashlink may automatically record a first evidence of service delivery associated with the user system 102a. The first evidence of service delivery (also referred to as service delivery evidence) can be recorded in a digital format as discussed herein.

In an embodiment, the second SMS 822 contains a second secured hashlink that is executable by the service provider system 106a or an associated service delivery person or a user associated with the service provider system 106a. In an embodiment, the second secured hashlink may be sent separately and not within the second SMS 822. In such cases, the computer-controlled evidence system 816 may generate a separate signal so that the signal may transmit the second secured hashlink to the service provider system 106a for processing through any of the ways including through an SMS.

Executing the second secured hashlink by the service provider system 106a or the associated user such as by clicking the second secured hashlink may automatically record a second evidence of the service delivery associated with the service provider system 106a. The second evidence of service delivery (also referred to as service delivery evidence) can be recorded in a digital format.

Executing the second secured hashlink by the service provider system 106a can be performed in the way as explained above with respect to executing the first secured hashlink by the user system 102a or the associated user.

In accordance with various embodiments, the first evidence of service delivery and the second evidence of service delivery can be one or more of an event, a digitally executable location input, a digitally executable voice input, and a digitally executable picture (digital image).

The computer-controlled evidence system 816 may further send a confirmation message in an electronic format along with a unique service proof token (SPT) to the user system 102a and the service provider system 106a upon completion of the service delivery. In an embodiment, completion can be defined based on executing of the first secured hashlink and the second secured hashlink. However, in an embodiment, if the first secured hashlink and the second secured hashlink are defined for start of the service only and not necessarily for service completion, service delivery and its completion successfully may be determined based on another set of secured hashlinks that are sent through a third SMS to the user system 102a and a fourth SMS to the service provider system 106a. The third SMS (not shown) may contain or be separately associated with a third secured hashlink. Similarly, the fourth SMS (not shown) may contain or be separately associated with a fourth secured hashlink. In such cases, end of the service and its successful completion may be determined when the third secured hashlink and the fourth secured hashlink are executed by the user system 102a and the service provider system 106a respectively or by respective users.

When the first secured hashlink and the second secured hashlink and/or the third secured hashlink and the fourth secured hashlink (if end of service is separately defined) are respectively executed by the user system 102a and the service provider system 106a, the computer-controlled evidence system 816 considers delivery of the service to the user associated with the user system 102a as complete. The computer-controlled evidence system 816 may generate a unique service proof token (SPT) executable through digital modes and send it to the user system 102a. This STP may be associated with the user system 102a and is unique to the user system 102a for the specific transaction and service delivery. If the same user associated with the same user system 102a arrives again or initiates again in the service setting for a new service request, a new unique service proof token may be generated.

The computer-controlled evidence system 816 may generate a second unique service proof token (SPT) executable through digital modes and send it to the service provider system 106a. This STP may be associated with the service provider system 106a and is unique to the service provider system 106a for the specific transaction and the service delivery. Both the STP associated with the user system 102a and the service provider system 106a are together indicative of completion and delivery of the service by the service provider system 106a to the user associated with the user system 102a in the service setting.

As discussed above, in an embodiment, two SPTs are generated-one associated with the user system 102a and the other associated with the service provider system 106a. These SPTs signify the completion of the service. In some embodiments, four SPTs may be generated as follows:

A first STP (SPT1) is generated that is associated with the user system 102a and represents start of the service. The SPT1 may be referred to as start of service proof token and signifies start of receipt of the service by the user associated with the user system 102a from the service delivery entity or the second entity. The SPT1 is sent to the user system 102a.

A second SPT (SPT2) is generated that is associated with the user system 102a and represents end of the service. The SPT2 may be referred to as end of service proof token and signifies end and successful delivery of the service to the user associated with the user system 102a by the service delivery entity. The SPT2 is sent to the user system 102a.

A third SPT (SPT3) is generated that is associated with the service provider system 106a and represents start of the service. The SPT3 may be referred to as the start of service proof token and signifies start of the delivery of the service to the user associated with the user system 102a by the service delivery entity. The SPT3 is sent to the service provider system 106a.

A fourth SPT (SPT4) is generated that is associated with the service provider system 106a and represents end of the service. The SPT4 may be referred to as end of service proof token and signifies end and successful delivery of the service to the user associated with the user system 102a by the service delivery entity. The SPT4 is sent to the service provider system 106a.

In some embodiments, as discussed above, only two SPTs are generated and sent to the user system 102a and the service provider system 106a representing complete delivery and end of the service to the user associated with the user system 102a by the service provider system 106a associated with the service delivery entity. All SPTs are digitally executable.

The computer-controlled evidence system 816 may be coupled to the blockchain device 502 as shown in FIG. 5 and may be configured to automatically store computer-executable instructions such as the digitally executable SPT associated with the user system 102a and the service provider system 106a. For example, the blockchain device 502 may store the SPT1, SPT2, SPT3, and SPT4. In embodiments where only two SPTs are generated representing end of the service, the blockchain device 502 may store the two SPTs.

In embodiments, the four SPTs: SPT1, SPT2, SPT3, and SPT4 may represent the evidence of the service delivery along with the status of the service delivery such as service start or service ending. In an embodiment, where only the two SPTs are generated, for example, when the first secured hashlink is activated by the user associated with the user system 102a, the first evidence of the service delivery may be recorded within an SPT. The first evidence of the service delivery may indicate completion of the service and is associated with the user system 102a that is the first SPT is sent to the user system 102a. Similarly, another SPT (such as the SPT4 discussed above) may be sent to the service provider system 106a which may contain the second evidence of the service delivery, which is indicative of the service completely delivered to the user by the service provider system. The SPTs (such as second SPT and the fourth SPT) sent to the user system 102a and the service provider system 106a respectively are sufficient to prove whether the services have been delivered entirely by the service provider system 106a to the user associated with the user system 102a or not. This provides an evidence to link the data ownership transfer at a later time based on evidence review recorded at an earlier time by the computer-controlled evidence system 816. In an example, the ownership trail may be recorded to document the ownership transfer the moment the service is delivered no matter whether the actual data is transferred the same moment or promised for a later time. In some embodiments, the SPTs may include coded components that may represent the ownership trial and a change in the ownership of the tradable data so that the change in ownership is immediately recorded in the blockchain through the SPTs collected as evidence irrespective of when the actual data is available. Therefore, by retrieving the SPTs from the blockchain device 502, delivery of the services can be proven by reading the coded and protected ownership trail. This facilitates in making appropriate payments and settling delivery of services that define payment transactions particularly when the consented data owned by the user is transferred to the buyer system or the service provider system at a later stage/time but the services to the user are delivered at an earlier time. Recording the delivery of the service can help identify evidence as needed through various technical components and associated embodiments enabling the marketplace network 100 and discussed herein.

In an embodiment, where the four SPTs are generated, for example, when the first secured hashlink is activated by the user associated with the user system 102a, a first evidence of the service delivery may be recorded within an SPT. The first evidence of the service delivery may indicate the start of the service and is associated with the user system 102a that is the first SPT is sent to the user system 102a.

A second evidence of the service delivery may be recorded within another SPT when the second secured hashlink is activated by the user associated with the user system 102a. The second evidence of the service delivery may indicate the end of the service and is associated with the user system 102a that is the SPT is sent to the user system 102a after the service is complete.

A third evidence of the service delivery may be recorded within an SPT such as the SPT3 discussed above when the third secured hashlink is activated by the user associated with the service provider system 106a. The third evidence of the service delivery may indicate the start of the service and is associated with the service provider system 106a that is the third SPT is sent to the service provider system 106a after the service starts.

A fourth evidence of the service delivery may be recorded within an SPT such as the SPT4 discussed above when the fourth secured hashlink is activated by the user associated with the service provider system 106a. The fourth evidence of the service delivery may indicate the end of the service and is associated with the service provider system 106a that is the fourth SPT is sent to the service provider system 106a after the service is complete.

In an embodiment with four SPTs, the four SPTs may be sufficient to prove when the services started and whether the services are delivered entirely by the service provider system 106a to the user associated with the user system 102a or not. Therefore, by retrieving these four SPTs from the blockchain device 502, the initiation and delivery of the services can be proven.

In some embodiments, the blockchain device 502 further stores location coordinates of the service provider system 106a along with time stamped computer-executable information associated with receipt of the location coordinates of the service provider system 106a. The time stamped computer-executable information signifies digital representation of a time parameter that indicate the time when the location coordinates of the service provider system 106a were received by the blockchain device 502. In embodiments, the time stamped information may indicate when the actual service was initiated for delivery by the service provider system 106a and when the service was completely delivered to the user associated with the user system 102a.

The marketplace server 110 may further include or be coupled to a central verification device 824 to verify the first evidence of the service delivery and the second evidence of the service delivery (discussed above) by retrieving the unique respective STPs from the blockchain device 502 upon request from an involved participant. In case the four STPs are generated in accordance with some embodiments as discussed above, the central verification device 824 may verify one or more of the first evidence of the service delivery, second evidence of the service delivery, third evidence of the service delivery, and the fourth evidence of the service delivery by retrieving the unique SPTs (such as the first SPT, second SPT, third SPT, and the fourth SPT) from the blockchain device 502 upon request from an external system. The external system can be the service provider system 106a or the user system 102a, etc. The external entity can be the buyer system as well who is not involved in the receipt or delivery or the service directly but is consuming the consented data of the user. The verification by the central verification device 824 may help determine whether one or more of the services were performed in the service setting or not.

The computer-controlled evidence system 816 may include combined mechanisms, software, and hardware components for facilitating recording of the evidence so that they are stored in a blockchain database 606 of the blockchain device 502. The evidence of the service delivery as recorded by the computer-controlled evidence system 816 are eventually converted into digital signals and tokens that may be stored along with the SPTs such as the first SPT (SPT1), second SPT (SPT2), third SPT (SPT3), and the fourth SPT (SPT4).

The computer-controlled evidence system 816 may include one or more of a global positioning system (GPS1), a voice recognition device, an image recognition device, and one or sensors connected in the service setting for recording evidence in various forms, and the like.

The computer-controlled evidence system 816 may include combined mechanisms, software, and hardware components for facilitating recording of the evidence so that they are stored in the blockchain database 606 of the blockchain device 502. The evidence of the service delivery as recorded by the computer-controlled evidence system 816 are eventually converted into digital signals and tokens that may be stored along with the SPTs such as the first SPT (SPT1), second SPT (SPT2), third SPT (SPT3), and the fourth SPT (SPT4).

In some embodiments, the service provider system 106a and the user system 10a may respectively include their GPS devices that may be configured to sense location information of the service provider system 106a and the user system (user system 102a. The GPS devices may be configured to sense location information of the service provider system 106a and the user system (mobile communication device) 102a, in an embodiment. In an example, when the user visits the service setting for availing the service, the sensed location information of the service provider system 106a and the user system 102a signify place of the delivery of the service and hence a location-dependent evidence of the presence of the service provider system 106a and the user system 102a during delivery of the service to the user is recorded.

The detection of location information of the user system 102a and the service provider system 106a by the first respective GPS devices that are individually controlled by respective owners (owner devices) may facilitate recording an evidence of the service delivery in the form of location information or location coordinates which indicate the presence of the user system (who receives the service) 102a and the service provider system (who delivers the service) 106a at the same location during the delivery of the service in the service setting. Each GPS may be defined to sense the location coordinates of the respective systems 102a and 106a reliably that may not be modified.

In some cases, other ways or recording evidence may be employed without limitations. These may include such as voice recognition, image recognition, intelligent ambient sound and video recording, etc. to detect respective identity information in the form of a verified image, voice, sound characteristic, etc. of the entity and/or the associated user system 102a and the like, and the service provider or the respective service provider system 106a.

One or more of the evidence as recorded from the one or more devices including such as the GPS devices are automatically generated upon activation of the first secured hashlink and the second secured hashlink (and in some cases the third secured hashlink and the fourth secured hashlink) by the user system 102a and the service provider system 106a respectively when the first SMS and the second SMS are sent to the user system 102a and the service provider system 106a. As soon as the secured hashlinks are activated, the two SPTs (and in some cases the four SPTs) that generally contain the evidence information including one or more of the location information (location-based evidence), image information (image-based evidence), voice information (voice-based evidence), and the sensed information are generated. In embodiments, when the four SPTs are generated based on the activation of the four discrete SPTs-two for start of the service and two for end of the service, the four SPTs may contain the evidence information, such that during start of the service, the two SPTs contain a first set of evidence information that is indicative of the evidence during start of the service, the other two SPTs contain a second set of evidence information that is indicative of the evidence at the end of the service delivery. However, in some embodiments, even with cases of the four secured hashlinks being generated and the four SPTs being created, evidence of the service delivery may be recorded only for the two secured hashlinks that are associated with the end of the service delivery as the third party might be interested only in knowing about the evidence of successful delivery of the service and not the start of the service.

At any point of time during transactional exchange or during the ownership transfer of the tradable data, if the evidence of the delivery is verified to be true, the data transfer automatically occurs digitally in favor of the participant such as the service provider system 106a through a digitally communicated signal. However, if the evidence is rejected due to lack of reliability or failure to an availability of the evidence at all or due to any other reason, the data transfer is not processed. The user may still counter a decision to reject the claim if the rejection is not on accurate grounds. In such a case, the user may choose other options such as to manually report the evidence of the service delivery to a concerned authority for making necessary corrections or take a legal route for prosecuting the matter if it does not agree with the decision.

As shown in FIG. 5, the evidence system may be connected with the blockchain ecosystem 500 to allow integrity of submission of the evidence of the service delivery and the service proof tokens as discussed above. This may facilitate association of an identity to the evidence thus submitted and also define and store a geographical and temporal identity such as when and in which location presence of the participants and their respective devices such as user system 102a and the service provider system 106a are noted. The blockchain configured ecosystem 500 may provide a crowdsourced integrity network for storing the evidence instead of locally stored information by different participants that may be tampered.

The computer-controlled evidence system interacts with the blockchain device 502. The blockchain ecosystem 500 may build trust among the various participants or entities and their associated computing terminals or devices even if the devices/terminals, etc. may not know one another. The blockchain network may allow connections and transactions and recording and sharing of the evidence and the service proof tokens in a trusted mode so that data transfer at a later time can be automated and promised without fail. A record of transactions and sharing and data from various terminals/devices stored on the blockchain in the form of computer-executable distributed blockchain ledgers 506 may provide proof to command the necessary trust among the terminals/devices (such as those associated with various participants including the user system 102a, service provider system 106a, etc.) to cooperate through a peer-to-peer or peer-to-client distributed digital ledger technology.

In accordance with various embodiments, different mechanisms may be employed for the computer-controlled evidence system to record the evidence and store them into the blockchain device 502. For example, in an embodiment, two-fold system may be employed such that the two-fold system may include a call- or SMS-based system as discussed above, wherein the SMS is sent or a call is made to the user system 102a and the service provider system 106a for enabling initiation of the start of the service tokens and the end of the service tokens.

The use of authorized data as currency as discussed above for buying and/or selling certain services through the marketplace network 100 may provide a facility of establishing an alternative currency or a centralized virtual currency in various technology ecosystems such as healthcare, insurance, research and innovation, crowdsourced scenarios etc. The payment engine 312 also referred to as a payment processing system or engine may be integrated with the centralized virtual currency termed herein as Pay Per Data (PPD) to provide a standardized and more efficient virtual currency that can provide easier tracking of and use of a consumer's virtual currency balance. The payment engine may implement a network communications system such as the systems 102, 104, and 106 that may allow the payment engine 312 to establish the marketplace network 100 based on common interest of the participants around transacting for the data.

PPD as the virtual currency or digital payment information that is associated with a value (e.g., monetary, loyalty based, etc.) is an area that merchants, consumers, payment processors, and issuers may recognized as important as the network grows for a particular industry ecosystem and as the participants adopt it into their daily routines. However, typical virtual currencies are not regulated by any organization or entity, which increases their susceptibility to fraud. PPD may generate its value by virtue of a significant worth associated with the approved data and therefore is not risky for trading as long as there is a secured way of transacting the data and keep the data safe. The present invention provides necessary security mechanisms through the use of the blockchain architecture as discussed elsewhere herein.

In some embodiments, the PPD may be converted in the form of a virtual currency for using services against the converted virtual currency at a later time. For example, a user might want to sell his/her data and generate an equivalent amount of worth of it in the form of the defined virtual currency, but may not avail any service at the same time. However, the virtual currency obtained by selling the data may be used in future for either purchasing any service from any of the service providers networked over the marketplace network 100 or may possibly convert into conventional currency if any of the participants are interested. In this way, the marketplace not only provides a way to purchase the services against the data but also allows the participants to use their data as the virtual currency for trading in the marketplace without restricted to buying the service against the time at the same time. In an example, the marketplace network 100 may be integrated with conventional marketplaces such that the marketplace network 100 may allow both type of transactions-conventional and those based on PPD.

The marketplace network 100 may enable reputation management of the service providers and buyers in the network to provide and collate inputs that can be used to calculate a reputation rating for the participants in order to provide enhanced service experience and trust building among the various participants. A reputation rating may include official certifications, but it may not as well. For instance, the users may provide inputs indicative of what they thought of the quality of service provided by the selected providers. Similarly, the service providers may provide inputs indicating how easy it was to work with the users, how quickly they paid, etc. Similarly, reputations can be generated for the buyers. Generating the reputation and providing the inputs for building reputation may be done through particular user interface displays, allowing receiving the reputation inputs from the participants by the marketplace network 100. Once the relevant reputation inputs are received, a reputation component (not shown) contained within the marketplace server 110 may update the reputation ranking (or other reputation indicia) for the corresponding participants, and stores it in the database 122, or in another data store so it can be accessed by other users, service providers or other participants in the marketplace network 100. In an embodiment, the database 122 and the blockchain database 606 may represent the same database of the ecosystem is blockchain configured. In some embodiments, they may be two separate databases where one or more functions of one database can be performed by the other one as well.

Some embodiments are listed herein as numbered examples additionally without limitations:

Example 1: An embodiment herein provides a computer-controlled marketplace network for facilitating seamless transactions among a plurality of marketplace network participant systems. The marketplace network includes a plurality of service provider systems associated with respective service provider participants and located remotely from one another physically in respective service settings that each includes one or more central servers, data stores, and cloud-based computing components for managing and processing delivery of one or more services in the service settings by the plurality of service provider systems. Each of the plurality of service provider systems are communicatively coupled to a respective merchant server. The marketplace network further includes a plurality of user systems associated with respective user participants located remotely from one another and remotely from the plurality of service provider systems and configured to generate a service request to one of the plurality of service provider systems in the marketplace network. The marketplace server facilitates marketplace transactions digitally by executing a set of computer-executable tasks for securely processing transactional exchanges among the marketplace network participant systems, wherein the transactional exchanges include at least exchanges of ownership rights for digitally stored data at least in part owned originally by the user participants. The marketplace server includes a marketplace interaction component where the service provider participants can establish their one or more offerings digitally for the transactional exchanges. The one or more offerings are associated with respective transactional values that are predefined across the marketplace network by the respective service provider participants. The marketplace server includes a memory circuit configured to store transactional information associated with each transactional exchange of the transactional exchanges among the participants in the marketplace network. The marketplace server includes a processing circuit in communication with the memory circuit and configured to process a transactional exchange digitally and generate an ownership trail of a transacted offering when a user participant consents for data ownership transfer, exclusively or inclusively for the data at least in part, from the user participant, toward a digital purchase and delivery of the offering, wherein the data at least in part has a value of at least equal to a transactional value of the offering exchanged between the service provider participant and the user participant over the marketplace network.

Example 2: An embodiment herein provides a merchant acquisition system for facilitating acquisition of an item in a digital marketplace network. The merchant acquisition system includes a merchant server communicatively coupled and associated with a service provider system. The merchant server includes a processor and a physical storage medium that stores merchandise information and transactional information associated with the service provider system. The processor is configured to define a set of digitally recognizable data valuation parameters for one or more entities and attributes associated with tradable data originally stored at a user system remotely located from the merchant server. The processor is further configured to publish the set of digitally recognizable data valuation parameters defined by the service provider system in the marketplace network along with digitally listed one or more offerings and transact for the item with a user participant associated with the user system with data ownership transfer for the tradable data at least in part owned originally by the user participant and valued at a transactional value no less than value of the item calculated in accordance with the set of digitally recognizable data valuation parameters defined by the service provider system.

The merchant server may be communicatively coupled to a buyer server located remotely from the merchant server, wherein the buyer server is associated with a respective buyer participant, such that the transactional value for the offering may be defined by the merchant server based on an input received from the buyer server. An ownership trail of the data ownership transfer for the data at least in part may include at least a transfer of the ownership from the user participant to the service provider participant, and from the service provider participant to the buyer participant either in real-time or deferred for a later time than when the acquisition of the item is performed.

The merchant server, the buyer server, and the user system are in communication with one another over a peer-to-peer communication network that maintains a decentralized blockchain ledger for tracking and recording the acquisition of the item and the ownership trail. Each of the merchant server, the buyer server, and the user system may include at least one processing circuit and at least one physical storage medium that stores at least a portion of the decentralized blockchain ledger including a distributed database to record acquisition information associated with the acquisition of the item that occur on the peer-to-peer communication network between at least two of the merchant server, the buyer server, and the user system.

Example 3: An embodiment herein provides a computer-controlled system for automated evidence-based transactional exchange between a service provider system associated with a service provider and a mobile communication device associated with a user. The system includes a merchant server configured to collect predefined information about a mobile communication device and an associated user. The predefined information includes at least a first computer-executable input indicative of an identifier of the mobile communication device and the associated user, and a second computer-executable input indicative of a service sought for delivery in the service setting. The merchant server is further configured to generate a first short message service component (SMS) that is sent to the mobile communication device. The merchant server is further configured to generate a second short message service component (SMS) that is sent to a service provider system. The first SMS and the second SMS contain a first secured hashlink and a second secured hashlink respectively that are executable by the user and the service provider respectively, such that the first SMS and the second SMS are indicative of delivery of the service. The merchant server is further configured to allow a transaction involving delivery of the service to the user and transfer of ownership of digitally executable data originally owned by the user to the service provider when the data is available at a later time in return of the service availed by the user.

Example 4: An embodiment herein provides a computer-controlled system for automated evidence-based transactional exchange between a service provider system associated with a service provider and a mobile communication device associated with a user. The system includes a server configured to collect predefined information about a mobile communication device and an associated user. The predefined information includes at least a first computer-executable input indicative of an identifier of the mobile communication device and the associated user, and a second computer-executable input indicative of a service sought for delivery in the service setting. The server is further configured to generate and send a confirmation electronic message along with a digitally executable unique service proof token (SPT) to the mobile communication device and the service provider system upon completion of the service delivery. The unique SPT is associated with each of the mobile communication device and the service provider system and records an evidence of the completion and delivery of the service by the service provider system to the user associated with the mobile communication device. The server is further configured to allow a transaction involving transfer of ownership of digitally executable data, originally owned by the user, to the service provider system when the data is available at a later time in return of the service availed by the user.

In an example, the various systems described herein and/or illustrated in the figures may be considered subsystems in the marketplace network 100. The various systems and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The systems that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In other examples, the systems and components described herein may be programmable modules and may be configured as a computer program product that includes a pre-configured set of instructions, which when performed, can result in actions as stated in conjunction with the methods and techniques described herein. In an example, the pre-configured set of instructions may be stored on a tangible non-transitory computer readable medium or a program storage device. In an example, the tangible non-transitory computer readable medium may be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein can include both hardware and software elements. The embodiments that are implemented in software include but are not limited to, firmware, resident software, microcode, etc.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

Embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
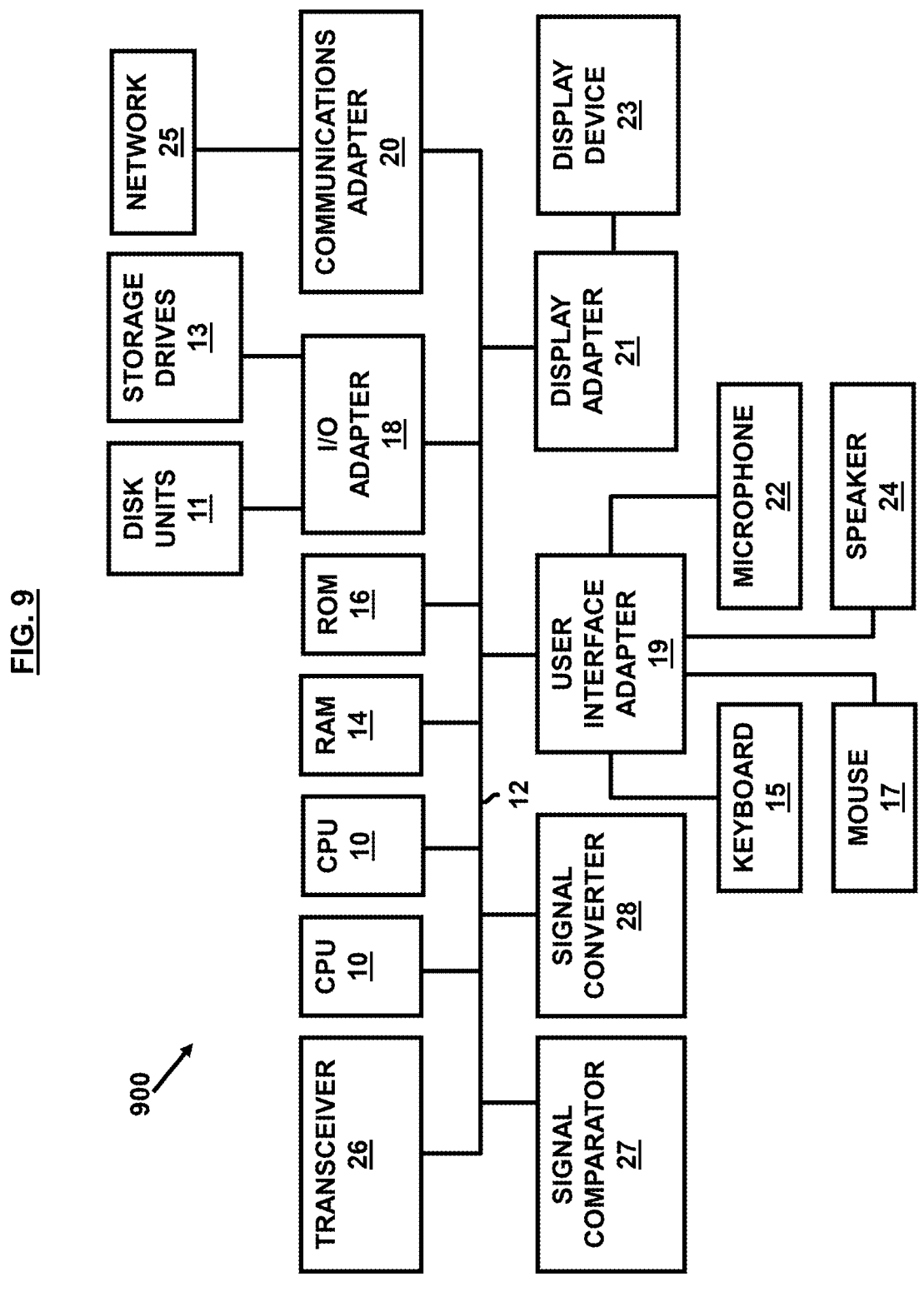
FIG. 9 is a block diagram illustrating a computer system according to an embodiment herein.

A representative hardware environment for practicing the embodiments herein is depicted in FIG. 9, with reference to FIGS. 1 through 8. This schematic drawing illustrates a hardware configuration of an information handling/computer system 900 in accordance with the embodiments herein. The system 900 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 900 can read the inventive instructions on the program storage devices and follow these instructions to execute the methodology of the embodiments herein. The system 900 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-controlled system for facilitating an evidence-based digital transaction between a service provider system associated with a service provider and a user device associated with a user, the system comprising:

a server comprising a memory storing instructions and a processor executing the instructions to:

collect information about the user device and the associated user, the information comprising an identifier of the user device and an indication of a service requested by the user;

generate a first digital message containing a first executable link comprising a first secured hashlink and a second digital message containing a second executable link comprising a second secured hashlink, the first digital message and the second digital message each comprising one of a short message service (SMS), an email, or a notification, the first executable link and the second executable link being activatable by either the user via the user device or the service provider via the service provider system;

transmit the first digital message and the second digital message such that activation of the first executable link by the at least one of the user via the user device and the service provider via the service provider system records an evidence of start of the service and activation of the second executable link by the at least one of the user via the user device and the service provider via the service provider system records an evidence of completion of the service requested by the user, and generate and send an electronic message along with a digitally executable unique service proof token (SPT) to at least one of the user device and the service provider system upon activation of at least one of the first executable link and the second executable link.

2. The computer-controlled system of claim 1, wherein the processor is to initiate, based on the evidence of the completion of the service, a transaction comprising confirmation of service delivery and at least one of:

providing access to digital data associated with the user, delivering the digital data, and transferring ownership of the digital data, in exchange for a compensation associated with the service.

3. The computer-controlled system of claim 1, wherein the instructions are to generate and send the electronic message to the at least one of the user device and the service provider system upon activation of the completion of the service after the activation of the second executable link.

4. The computer-controlled system of claim 3, wherein the digitally executable unique service proof token (SPT) comprises metadata identifying one or more of a service type, user identifier, service provider identifier, execution timestamp, and a status of the digital data associated with the user.

5. The system of claim 1, wherein the activation of the at least one of the first executable link and the second executable link by the at least one of the user device and the service provider system automatically causes the server to record a location of one or more of the user device and the service provider system, and wherein an association of a recorded location with an activation time of the second executable link is used as the evidence of the completion of the service.

6. The computer-controlled system of claim 1, wherein the server is to automatically record location coordinates of the user device and the service provider system upon activation of the first executable link and the second executable link.

7. A non-transitory program storage device, readable by a computer, comprising executable instructions for performing a method for facilitating a digital transaction between a service provider system associated with a service provider and a user device associated with a user, the method comprising:

collecting, by a server comprising a memory storing instructions and a processor executing the instructions, information about the user device and the associated user, the information comprising an identifier of the user device and an indication of a service requested by the user;

generating, by the server, one or more digital messages, each of the one or more digital messages comprising one of a short message service (SMS), an email, or a notification and each digital message including an executable link comprising a secured hashlink being activatable by either the user or the service provider;

transmitting, by the server, at least one of the digital messages such that activation of the executable link by at least one of the user device and the service provider system records an evidence of start of the service and activation of the executable link by the at least one of the user via the user device and an evidence of completion of the service requested by the user; and generating and sending, by the server, an electronic message along with a digitally executable unique service proof token (SPT) to at least one of the user device and the service provider system upon activation of the executable link.

8. The non-transitory program storage device of claim 7, wherein the processor is to initiate, based on the evidence of the completion of the service, a transaction comprising confirmation of the service and at least one of:

providing access to digital data associated with the user, at least in part, delivering the digital data, and transferring ownership of the digital data, in exchange for a compensation associated with the service.

9. The non-transitory program storage device of claim 8, wherein the executable link is executable with a click such that the activation of the executable link records the evidence of the completion of the service.

10. A computer-implemented method for facilitating a digital transaction between a service provider system associated with a service provider and a user device associated with a user, the method comprising:

collecting, by a server comprising a processor executing instructions stored in a memory, information about the user device and the associated user, the information comprising an identifier of the user device and an indication of a service requested by the user;

generating, by the server, one or more digital messages, each of the one or more digital messages comprising one of a short message service (SMS), an email, or a notification and each digital message including an executable link comprising a secured hashlink generated by applying a secure hash algorithm to at least a transaction identifier and a time stamp associated with the service requested by the user, the executable link being activatable by either the user device or the service provider system;

transmitting, by the server, at least one of the digital messages such that activation of the executable link by at least one of the user device or the service provider system records evidence of start of the service and activation of the executable link by the at least one of the user via the user device and an evidence of completion of the service requested by the user; and generating and sending, by the server, an electronic message along with a digitally executable unique service proof token (SPT) to at least one of the user device and the service provider system upon activation of the executable link.

11. The method of claim 10, wherein the evidence of completion of the service comprises timestamped digital verification data that is automatically stored in a distributed database accessible by the server.

12. The method of claim 10, comprising, upon activation of the executable link, automatically recording at least one of a location of the activating device, a date and time of the activation, and an identifier of an activated executable link, and storing recorded information as part of the evidence of the service completion.

13. The method of claim 10, comprising executing a digital transaction after completion of the service, wherein the digital transaction comprises at least one of:

providing a secure access link to digital data associated with the user, initiating delivery of the digital data from a network-connected storage location, and transferring ownership of the digital data, in exchange for compensation associated with the service.

14. The method of claim 13, wherein the digital data is valued at no less than a value of the service calculated in accordance with a set of digitally recognizable data valuation parameters defined by the service provider system.

15. The method of claim 13, comprising accessing the digital data by the service provider system automatically from a database, communicatively connected with the user device and the service provider system, when the data is available upon submitting the SPT indicative of the completion of the service.

16. The non-transitory program storage device of claim 7, wherein the SPT comprises metadata identifying one or more of a service type, user identifier, service provider identifier, execution timestamp, and a status of the digital data associated with the user.

17. The non-transitory program storage device of claim 7, wherein the evidence of completion of the service comprises timestamped digital verification data that is automatically stored in a distributed database accessible by the server.

18. The method of claim 10, wherein the SPT comprises metadata identifying one or more of a service type, user identifier, service provider identifier, execution timestamp, and a status of the digital data associated with the user.

19. The method of claim 13, wherein the executable link is executable with a click such that the activation of the executable link records the evidence of the completion of the service.

* * * * *